United States Patent
Kusumoto et al.

(10) Patent No.: US 10,989,319 B2
(45) Date of Patent: Apr. 27, 2021

(54) THREE-WAY FLOWRATE CONTROL VALVE AND TEMPERATURE CONTROL DEVICE USING SAME

(71) Applicant: SHINWA CONTROLS CO., LTD., Kawasaki (JP)

(72) Inventors: Tatsushi Kusumoto, Kawasaki (JP); Koji Matsuda, Kawasaki (JP)

(73) Assignee: SHINWA CONTROLS CO., LTD., Kawasaki (JP)

(*) Notice: Subject to any disclaimer, the term of this patent is extended or adjusted under 35 U.S.C. 154(b) by 36 days.

(21) Appl. No.: 16/615,555

(22) PCT Filed: May 17, 2018

(86) PCT No.: PCT/JP2018/019033
§ 371 (c)(1),
(2) Date: Nov. 21, 2019

(87) PCT Pub. No.: WO2018/221233
PCT Pub. Date: Dec. 6, 2018

(65) Prior Publication Data
US 2020/0173565 A1 Jun. 4, 2020

(30) Foreign Application Priority Data
Jun. 2, 2017 (JP) .............................. JP2017-110030

(51) Int. Cl.
*F16K 11/076* (2006.01)
*G05D 23/13* (2006.01)

(52) U.S. Cl.
CPC ........ *F16K 11/076* (2013.01); *G05D 23/1313* (2013.01)

(58) Field of Classification Search
CPC .......................... F16K 11/076; G05D 23/1313
See application file for complete search history.

(56) References Cited

U.S. PATENT DOCUMENTS

| 3,749,357 A | 7/1973 | Fowler |
| 3,848,849 A | 11/1974 | Alexander |

(Continued)

FOREIGN PATENT DOCUMENTS

| JP | 7-190217 A | 7/1995 |
| JP | 6104443 B1 | 3/2017 |

OTHER PUBLICATIONS

International Preliminary Report on Patentability and Written Opinion of the International Searching Authority, dated Dec. 12, 2019, for International Application No. PCT/JP2018/019033, along with an English translation.

(Continued)

*Primary Examiner* — Kevin R Barss
(74) *Attorney, Agent, or Firm* — Birch, Stewart, Kolasch & Birch, LLP

(57) ABSTRACT

Provided is a three-way valve for flow rate control capable of suppressing an increase in driving torque for a valve body, which is caused due to contact between the valve body and a valve port forming member. The three-way valve for flow rate control includes: a valve main body (6) including a valve seat (8), the valve seat (8) having a columnar space and having a first valve port (9), which allows outflow of a fluid and has a rectangular cross section, and a second valve port (18), which allows outflow of a fluid and has a rectangular cross section; first and second valve port forming members (70) (80), which are fitted to the valve main body (6) and form the first valve port (9) and the second valve port (18), respectively; a valve body (34) being provided in a freely rotatable manner in the valve seat (8) of the valve main body (6) so as to simultaneously switch the first valve port (9) from a closed state to an opened state and switch the second valve port (18) from an opened state to a closed state, the valve body (34) having a cylindrical shape and having an opening; a pressure applying portion (94) (96) configured to (Continued)

apply pressures of the fluid leaking through a gap between the valve body (34) and the valve seat (8) to the first and second valve port forming members (70) (80) so as to suppress shift of a position of the valve body (34) when the valve body (34) opens and closes the first valve port (9) and the second valve port (18); and drive means (3) for driving the valve body (34) to rotate.

9 Claims, 19 Drawing Sheets

(56) References Cited

U.S. PATENT DOCUMENTS

| | | | |
|---|---|---|---|
| 10,215,293 B2* | 2/2019 | Hiraoka | H01L 23/473 |
| 2013/0134336 A1* | 5/2013 | Lin | F16K 11/0743 |
| | | | 251/129.12 |
| 2015/0135749 A1* | 5/2015 | Ohta | F25B 49/02 |
| | | | 62/151 |
| 2018/0328501 A1 | 11/2018 | Hiraoka | |

OTHER PUBLICATIONS

International Search Report for PCT/JP2018/019033 dated Aug. 21, 2018.
Written Opinion of the International Searching Authority for PCT/JP2018/019033 (PCT/ISA/237) dated Aug. 21, 2018.

\* cited by examiner (a)

(b)

(a)

(b)

(a)

OPENING DEGREES 0~50%

(b)

OPENING DEGREES 50~100%

THREE-WAY FLOWRATE CONTROL VALVE AND TEMPERATURE CONTROL DEVICE USING SAME

TECHNICAL FIELD

The present invention relates to a three-way valve for flow rate control and a temperature control device using the same.

BACKGROUND ART

Hitherto, as a technology relating to a three-way valve for flow rate control, the applicant of the present invention has already proposed a three-way valve for flow rate control disclosed in, for example, Patent Literature 1.

The three-way valve for flow rate control disclosed in Patent Literature 1 includes: a valve main body including a valve seat, the valve seat having a columnar space and having a first valve port, which allows inflow of a first fluid and has a rectangular cross section, and a second valve port, which allows inflow of a second fluid and has a rectangular cross section; a valve body being provided in a freely rotatable manner in the valve seat of the valve main body so as to simultaneously switch the first valve port from a closed state to an opened state and switch the second valve port from an opened state to a closed state, the valve body having a half-cylindrical shape with a predetermined central angle and having a curved-surface shape at each of both end surfaces of the valve body in a circumferential direction; and drive means for driving the valve body to rotate.

CITATION LIST

Patent Literature

[PTL 1] JP 6104443 B2

SUMMARY OF INVENTION

Technical Problem

The present invention has an object to provide a three-way valve for flow rate control, which is configured to apply a pressure of a fluid leaked through a gap between a valve body and a valve seat to first and second valve port forming members, and is capable of suppressing an increase in driving torque for the valve body caused due to contact between the valve body and a valve port forming member as compared to a case of not including a pressure applying portion configured to suppress a shift of a position of the valve body when the valve body opens and closes first and second valve ports, and a temperature control device using the three-way valve for flow rate control.

Solution to Problem

According to the invention of claim 1, provided is a three-way valve for flow rate control, including: a valve main body including a valve seat, the valve seat having a columnar space and having a first valve port, which allows outflow of a fluid and has a rectangular cross section, and a second valve port, which allows outflow of the fluid and has a rectangular cross section; first and second valve port forming members, which are fitted to the valve main body and form the first valve port and the second valve port, respectively; a valve body being provided in a freely rotatable manner in the valve seat of the valve main body so as to simultaneously switch the first valve port from a closed state to an opened state and switch the second valve port from an opened state to a closed state, the valve body having a cylindrical shape and having an opening; a pressure applying portion configured to apply a pressure of the fluid leaking through a gap between the valve body and the valve seat to the first and second valve port forming members so as to suppress shift of a position of the valve body when the valve body opens and closes the first valve port and the second valve port; and drive means for driving the valve body to rotate.

According to the invention of claim 2, provided is a three-way valve for flow rate control, including: a valve main body including a valve seat, the valve seat having a columnar space and having a first valve port, which allows inflow of a first fluid and has a rectangular cross section, and a second valve port, which allows inflow of a second fluid and has a rectangular cross section; first and second valve port forming members, which are fitted to the valve main body and form the first valve port and the second valve port, respectively; a valve body being provided in a freely rotatable manner in the valve seat of the valve main body so as to simultaneously switch the first valve port from a closed state to an opened state and switch the second valve port from an opened state to a closed state, the valve body having a cylindrical shape and having an opening; a pressure applying portion configured to apply pressures of the first fluid and the second fluid leaking through a gap between the valve body and the valve seat to the first and second valve port forming members so as to suppress shift of a position of the valve body when the valve body opens and closes the first valve port and the second valve port; and drive means for driving the valve body to rotate.

According to the invention of claim 3, in the three-way valve for flow rate control as described in claim 1, the pressure applying portion applies the pressure of the fluid leaking through the gap between the valve body and the valve seat to surfaces of the first and second valve port forming members opposite to the valve body, and supports the valve body by the first and second valve port forming members, thereby suppressing the shift of the position of the valve body caused due to a difference in pressure of the fluid flowing out or flowing in through the first valve port and the second valve port.

According to the invention of claim. 4, in the three-way valve for flow rate control as described in any one of claims 1 to 3, the pressure applying portion is separated from the fluid flowing through the first valve port and the second valve port.

According to the invention of claim 5, in the three-way valve for flow rate control as described in claim 1, the first and second valve port forming members are fitted so as to be freely movable in a direction of moving close to and away from the valve body, and wherein the three-way valve for flow rate control includes an adjusting member configured to adjust a position of each of the first and second valve port forming members by pushing and moving a surface of each of the first and second valve port forming members opposite to the valve body.

According to the invention of claim 6, in the three-way valve for flow rate control as described in claim 1, the valve main body includes a connecting member configured to connect a member allowing the fluid to flow through the valve main body, and first and second flow passage forming members configured to connect the connecting member and the first and second valve port forming members in a sealed state.

According to the invention of claim 7, in the three-way valve for flow rate control as described in claim 5, the adjusting member pushes and moves each of the first and second valve port forming members through intermediation of an elastic member that allows each of the first and second valve port forming members to move in a direction of moving close to and away from the valve body.

According to the invention of claim 8, provided is a temperature control device, including: temperature control means having a flow passage for temperature control, which allows a fluid for temperature control to flow therethrough, the fluid for temperature control including a lower temperature fluid and a higher temperature fluid adjusted in mixture ratio; first supply means for supplying the lower temperature fluid adjusted to a first predetermined lower temperature; second supply means for supplying the higher temperature fluid adjusted to a second predetermined higher temperature; mixing means, which is connected to the first supply means and the second supply means, for mixing the lower temperature fluid supplied from the first supply means and the higher temperature fluid supplied from the second supply means and supplying a mixture of the lower temperature fluid and the higher temperature fluid to the flow passage for temperature control; and a flow rate control valve configured to divide the fluid for temperature control having flowed through the flow passage for temperature control between the first supply means and the second supply means while controlling a flow rate of the fluid for temperature control, wherein the flow rate control valve of any one of claims 1, 3 to 7 is used as the flow rate control valve.

According to the invention of claim 9, provided is a temperature control device, including: temperature control means having a flow passage for temperature control, which allows a fluid for temperature control to flow therethrough, the fluid for temperature control including a lower temperature fluid and a higher temperature fluid adjusted in mixture ratio; first supply means for supplying the lower temperature fluid adjusted to a first predetermined lower temperature; second supply means for supplying the higher temperature fluid adjusted to a second predetermined higher temperature; a flow rate control valve, which is connected to the first supply means and the second supply means, for flowing, to the flow passage for temperature control, the lower temperature fluid supplied from the first supply means and the higher temperature fluid supplied from the second supply means while adjusting the mixture ratio thereof, wherein the three-way valve for flow rate control of any one of claims 2 to 7 is used as the flow rate control valve.

Advantageous Effects of Invention

According to the present invention, the three-way valve for flow rate control capable of suppressing the increase in driving torque for the valve body, which is caused due to contact between the valve body and the valve port forming member, and the temperature control device using the three-way valve for flow rate control as compared to the case of not including the pressure applying portion configured to apply the pressure of the fluid leaking through the gap between the valve body and the valve seat to the first and second valve port forming members so as to suppress the shift of the position of the valve body when the valve body opens and closes the first and second valve ports can be provided.

DESCRIPTION OF EMBODIMENTS

In the following, embodiments of the present invention are described with reference to the drawings.

First Embodiment

Figure 1:
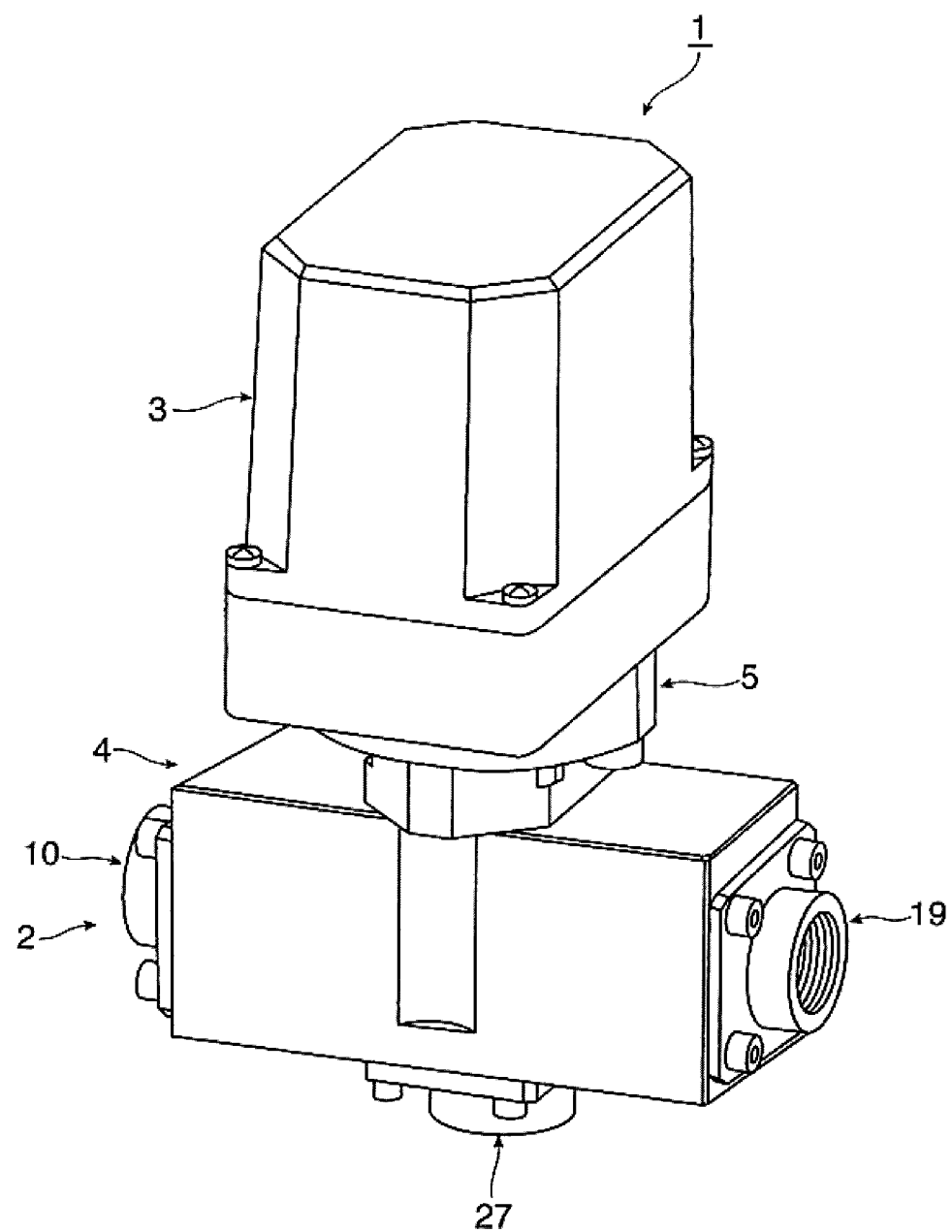
FIG. 1 is a perspective view for illustrating an outer appearance of a three-way motor valve as one example of a three-way valve for flow rate control according to a first embodiment of the present invention.
Figure 3:
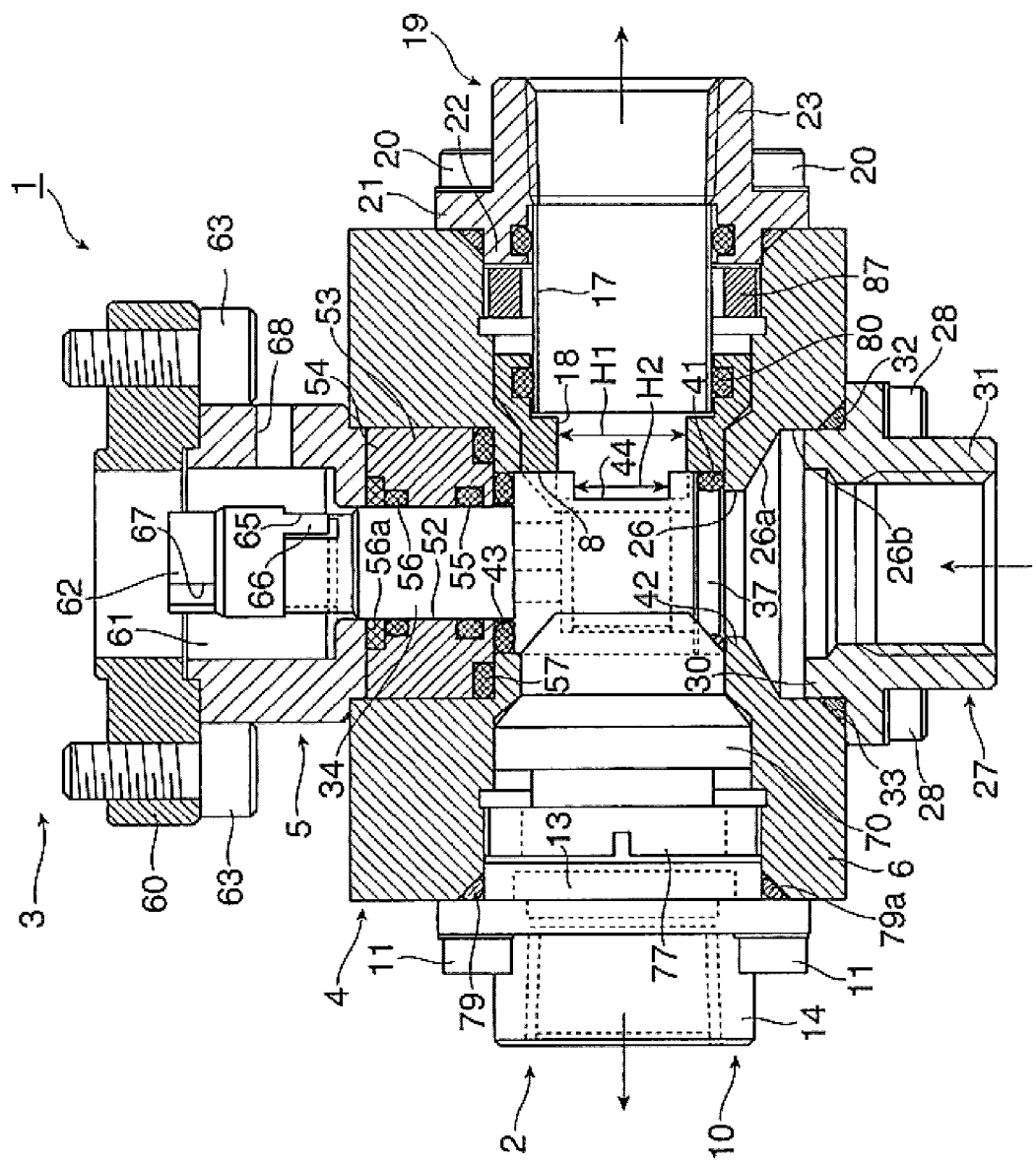
FIG. 3 is a sectional view taken along the line A-A of FIG. 2(b), for illustrating the three-way motor valve as one example of the three-way valve for flow rate control according to the first embodiment of the present invention.
Figure 4:
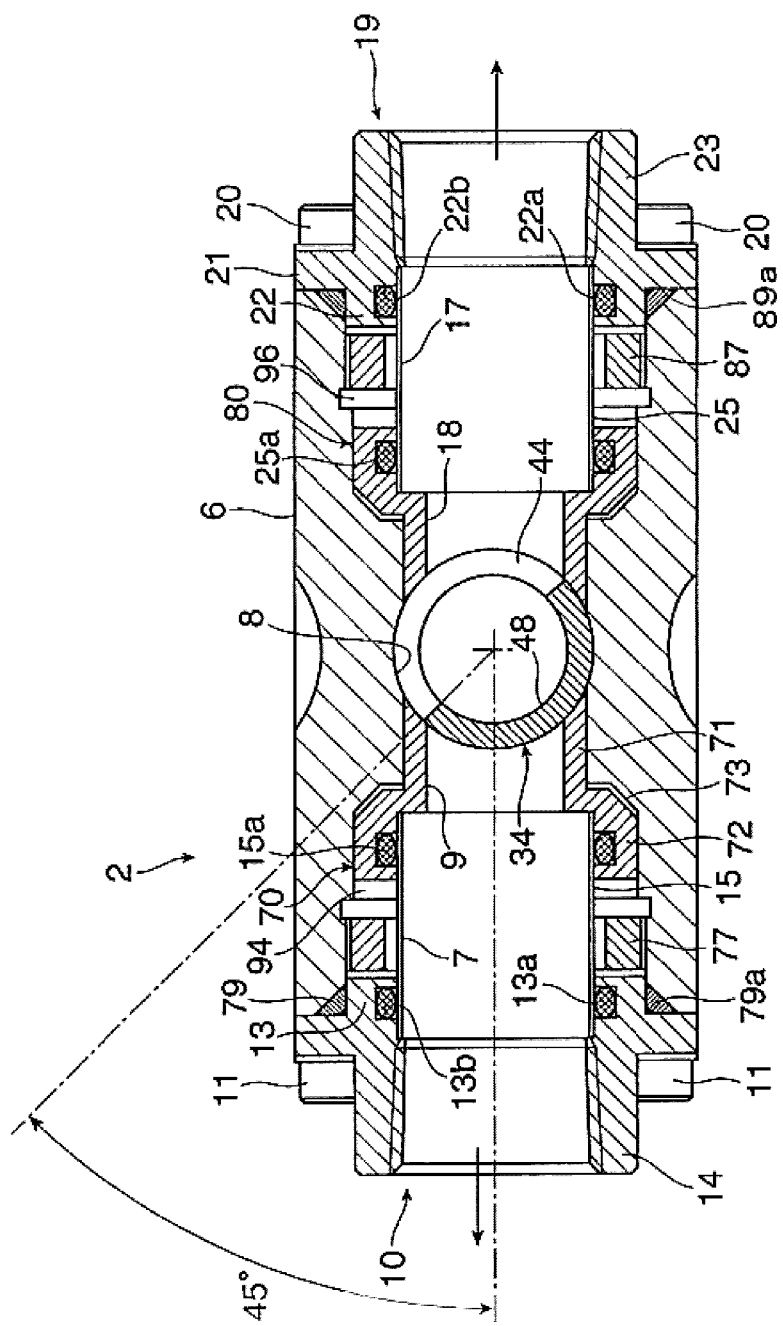
FIG. 4 is a sectional view taken along the line B-B of FIG. 2(a), for illustrating the three-way motor valve as one example of the three-way valve for flow rate control according to the first embodiment of the present invention.
Figure 5:
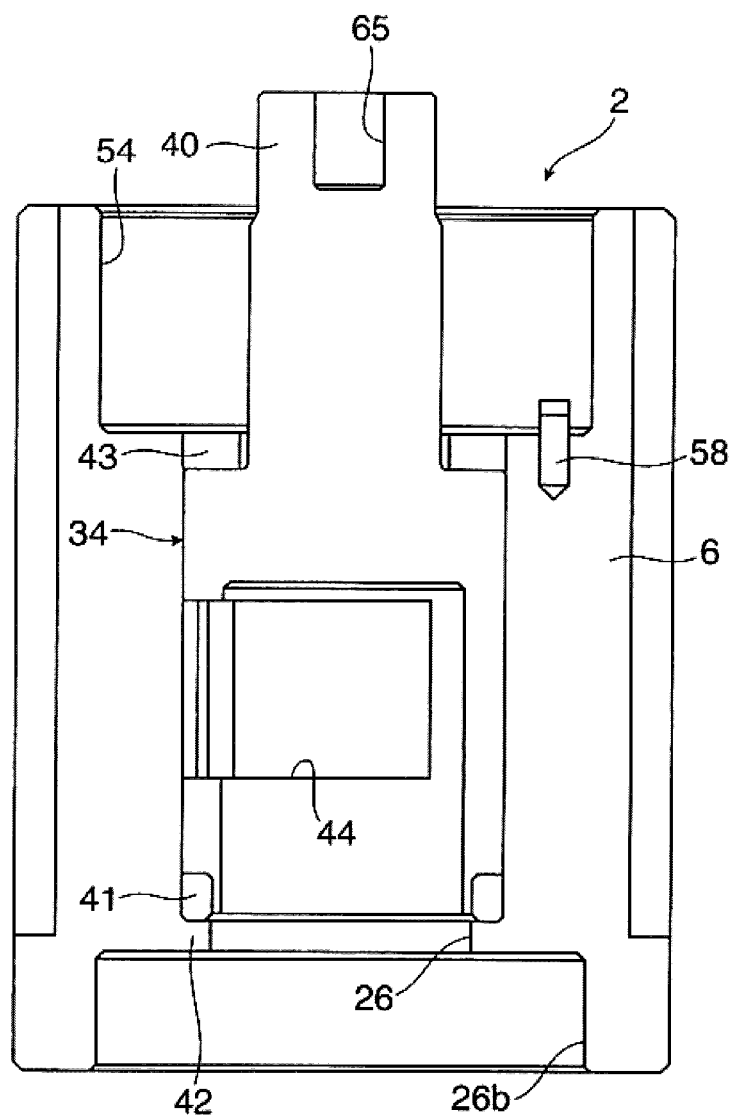
FIG. 5 is a sectional view taken along the line C-C of FIG. 2(a), for illustrating the three-way motor valve as one example of the three-way valve for flow rate control according to the first embodiment of the present invention.
Figure 6:
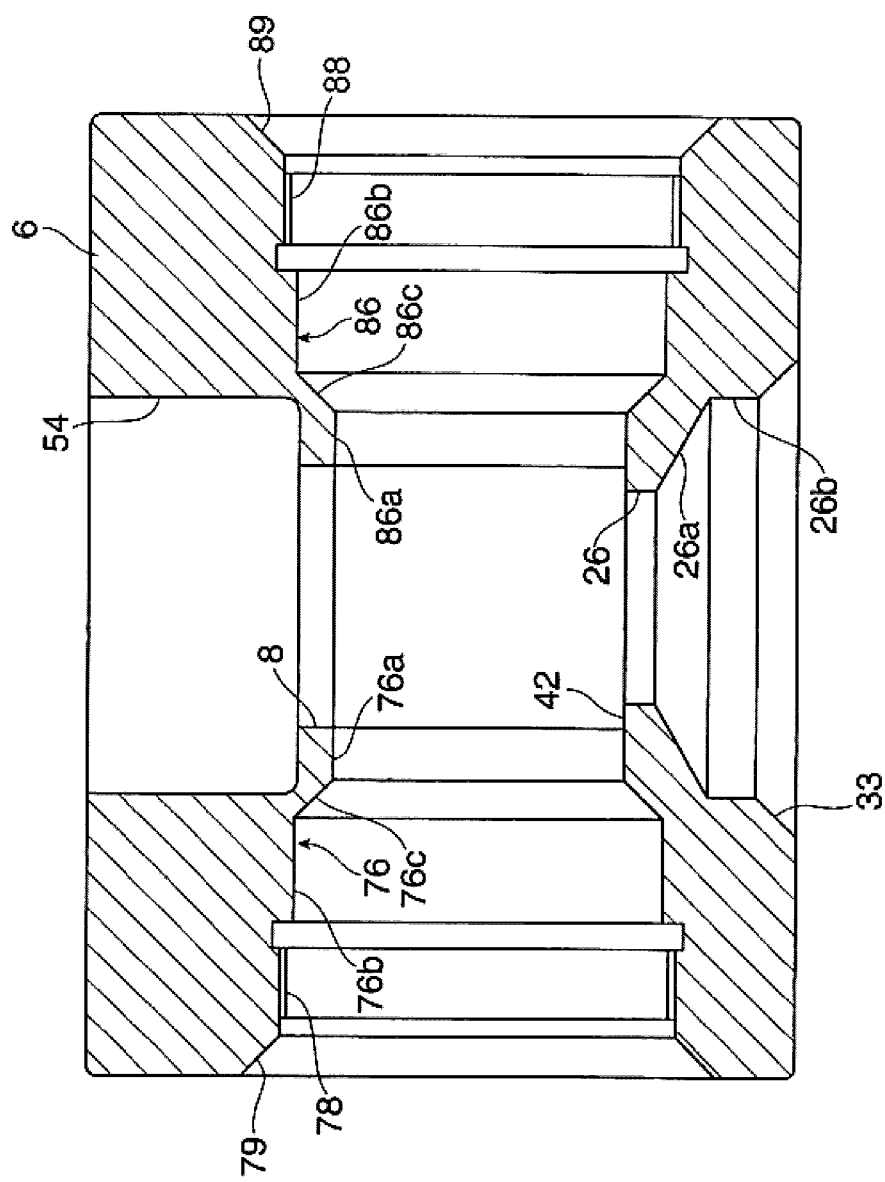
FIG. 6 is a sectional configuration view for illustrating a valve main body.
Figure 7:
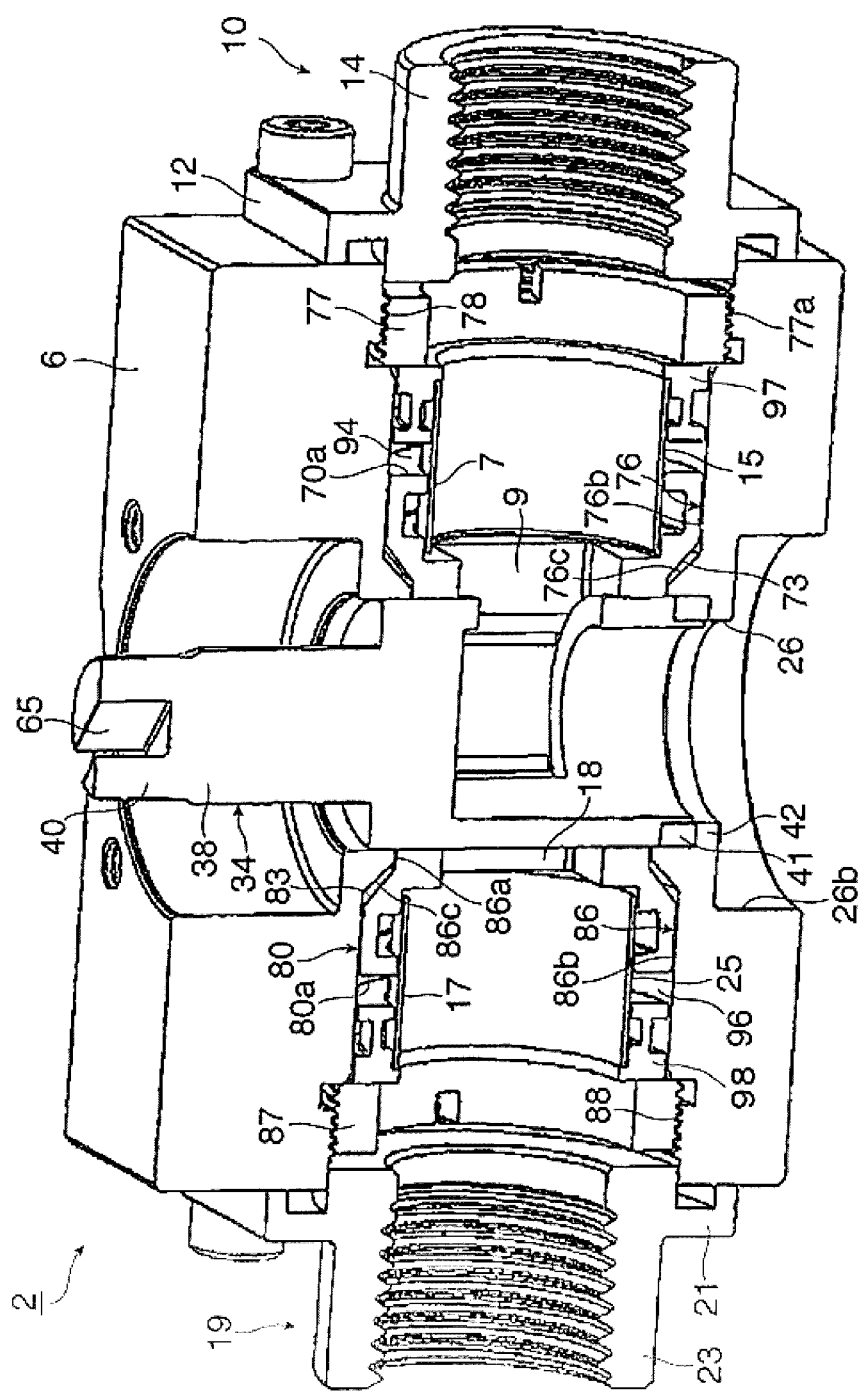
FIG. 7 is a sectional perspective view for illustrating relevant parts of the three-way motor valve as one example of the three-way valve for flow rate control according to the first embodiment of the present invention.
Figure 8:
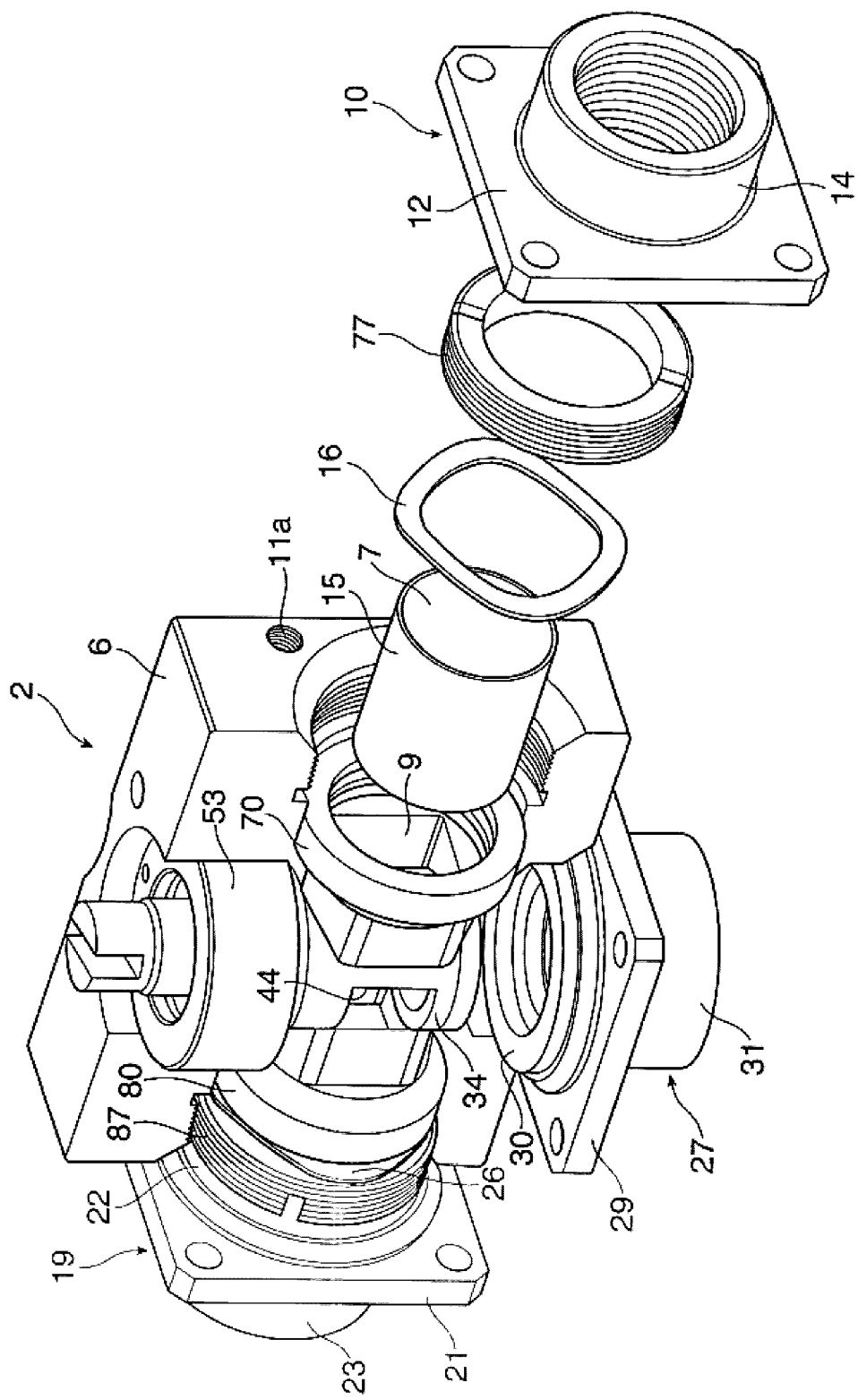
FIG. 8 is an exploded perspective view for illustrating the relevant parts of the three-way motor valve as one example of the three-way valve for flow rate control according to the first embodiment of the present invention.

FIG. 1 is a perspective view for illustrating an outer appearance of a three-way motor valve as one example of a three-way valve for flow rate control according to a first embodiment of the present invention. FIG. 2(a) is a front view for illustrating the three-way motor valve. FIG. 2(b) is a right side view of FIG. 2(a). FIG. 2(c) is a bottom view of an actuator. FIG. 3 is a sectional view taken along the line A-A of FIG. 2(b). FIG. 4 is a sectional view taken along the line B-B of FIG. 2(a). FIG. 5 is a sectional view taken along the line C-C of FIG. 2(a). FIG. 6 is a sectional view for illustrating a valve main body of the three-way motor valve. FIG. 7 is a sectional perspective view for relevant parts of the three-way motor valve. FIG. 8 is an exploded perspective view for illustrating the relevant parts of the three-way motor valve.

A three-way motor valve 1 is constructed as a rotary three-way valve. As illustrated in FIG. 1, the three-way motor valve 1 mainly includes a valve portion 2 arranged at a lower portion thereof, an actuator 3 arranged at an upper portion thereof, and a sealing portion 4 and a coupling portion 5, which are arranged between the valve portion 2 and the actuator 3.

As illustrated in FIG. 2 to FIG. 8, the valve portion 2 includes a valve main body 6 obtained by forming metal, for example, SUS, into a substantially rectangular parallelepiped shape. As illustrated in FIG. 3 and FIG. 4, a first outflow port 7 and a first valve port 9 are formed in one side surface (left side surface in the illustrated example) of the valve main body 6. The first outflow port 7 allows inflow of a fluid. The first valve port 9 has a rectangular cross section, and communicates with a valve seat 8 having a columnar space.

In the first embodiment of the present invention, instead of directly forming the first outflow port 7 and the first valve port 9 in the valve main body 6, a first valve seat 70 as one example of a first valve port forming member having the first valve port 9, and a first flow passage forming member 15 forming the first outflow port 7 are fitted to the valve main body 6, thereby providing the first outflow port 7 and the first valve port 9.

Figure 9:
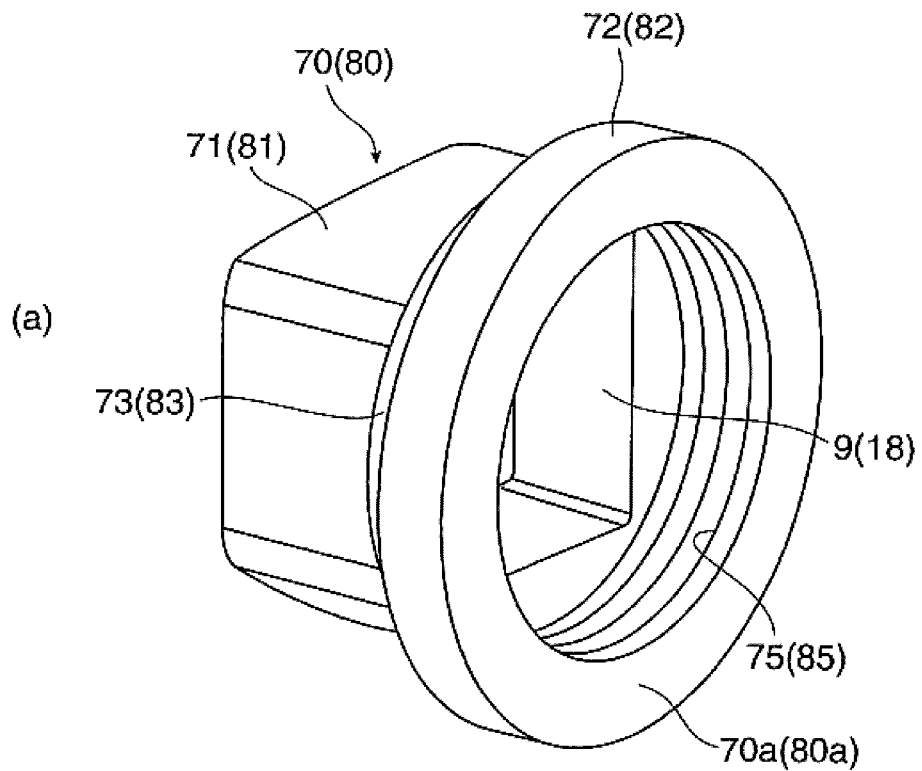
FIG. 9 are configuration views for illustrating a valve seat.
Figure 9:
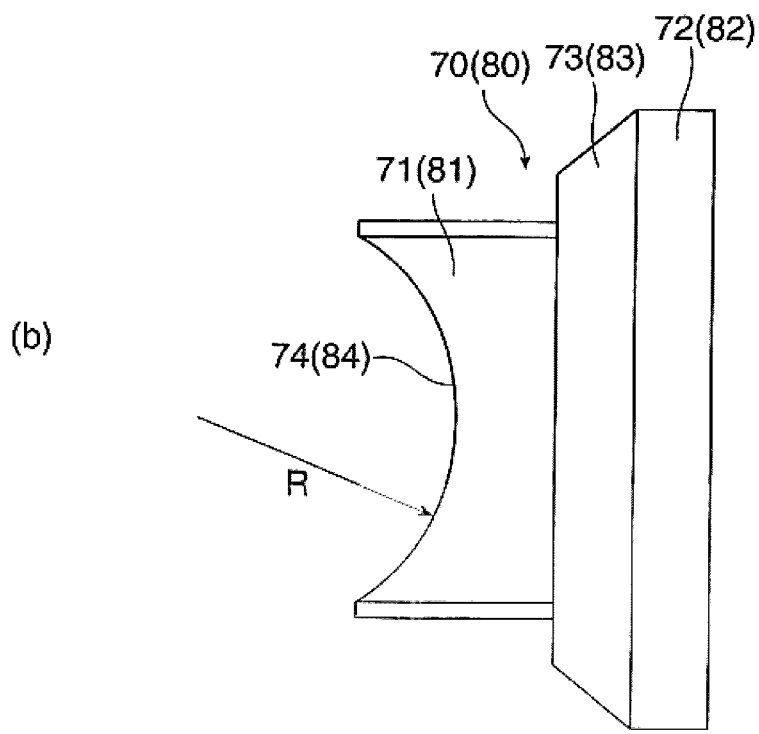

As illustrated in FIG. 9, the first valve seat 70 integrally includes a rectangular tube portion 71, a cylindrical portion 72, and a tapered portion 73. The rectangular tube portion 71 has a rectangular tube shape and is provided inside the valve main body 6. The cylindrical portion 72 has a cylindrical shape and is provided outside the valve main body 6. The tapered portion 73 has an outer diameter increasing toward the cylindrical portion 72 side and is arranged between the rectangular tube portion 71 and the cylindrical portion 72. The first valve port 9 is formed in the rectangular tube portion 71 of the first valve seat 70, and has a rectangular prism shape having a rectangular cross section (square cross section in the first embodiment of the present invention). Further, one end portion of the first flow passage forming member 15 forming the first outflow port 7 is inserted in a sealed state into the cylindrical portion 72 of the first valve seat 70. As illustrated in FIG. 4, a gap between the cylindrical portion 72 of the first valve seat 70 and the first flow passage forming member 15 is sealed by an O-ring 15a. As illustrated in FIG. 9, a recessed groove 75 configured to receive the O-ring 15a therein is formed in an inner peripheral surface of the cylindrical portion 72 of the first valve seat 70.

As a material for the first valve seat 70, for example, so-called "super engineering plastic" is used. The super engineering plastic has higher heat resistance and higher mechanical strength under a high temperature than ordinary engineering plastic. Examples of the super engineering plastic include, for example, polyether ether ketone (PEEK), polyphenylene sulfide (PPS), polyether sulfone (PES), polyamide imide (PAI), a liquid crystal polymer (LCP), polytetrafluoroethylene (PTFE), polychlorotrifluoroethylene (PCTFE), polyvinylidene fluoride (PVDF), or composite materials thereof. As the material for the first valve sheet 70, there may be used, for example, "TECAPEEK" (trademark) manufactured by Ensinger Japan Co., Ltd. serving as a PEEK resin material for cutting work, and "TECAPEEK TF 10 blue" (product name) having blending therein 10% PTFE, which is excellent in sliding property, is particularly suitably used.

As illustrated in FIG. 6 and FIG. 7, a recess 76 is formed in the valve main body 6 by, for example, machining. The recess 76 has a shape corresponding to an outer shape of the first valve seat 70 and similar to the shape of the valve seat 70. The recess 76 includes a rectangular tube portion 76a corresponding to the rectangular tube portion 71 of the first valve seat 70, a cylindrical portion 76b corresponding to the cylindrical portion 72, and a tapered portion 76c corresponding to the tapered portion 73. A length of the cylindrical portion 76b of the valve main body 6 is set larger than a length of the cylindrical portion 72 of the first valve seat 70. As described later, the cylindrical portion 76b of the valve main body 6 forms a first pressure applying portion 94. The first valve seat 70 is fitted to the recess 76 of the valve main body 6 so as to be freely movable, although by a slight distance, in a direction of moving close to and away from a valve shaft 34 serving as a valve body.

Under a state in which the first valve seat 70 is fitted to the recess 76 of the valve main body 6, a slight gap is defined between an outer peripheral surface of the first valve seat 70 and the inner peripheral surface of the recess 76 of the valve main body 6. A fluid having flowed into the valve seat 8 may leak and flow into a region around an outer periphery of the first valve seat 70 through the slight gap. Further, the fluid having leaked into the region around the outer periphery of the first valve seat 70 is led into the first pressure applying portion 94 being a space defined on an outer side of the cylindrical portion 72 of the first valve seat 70. The first pressure applying portion 94 is configured to apply a pressure of the fluid to a surface 70a of the first valve seat 70 opposite to the valve shaft 34. As described later, the fluid flowing into the valve seat 8 is a fluid flowing out through a second valve port 18 as well as a fluid flowing out through the first valve port 9. The first pressure applying portion 94 is partitioned under a state in which the first flow passage forming member 15 seals the first pressure applying portion 94 with respect to the first outflow port 7.

The pressure of the fluid, which is to be applied to the valve shaft 34 arranged inside the valve seat 8, depends on a flow rate of the fluid determined by an opening/closing degree of the valve shaft 34. The fluid flowing into the valve seat 8 also flows (leaks) through the first valve port 9 and the second valve port 18 into a slight gap defined between the valve seat 8 and an outer peripheral surface of the valve shaft 34. Therefore, into the first pressure applying portion 94 adapted for the first valve seat 70, not only the fluid flowing out through the first valve port 9 flows (leaks), but also the fluid flowing into the slight gap defined between the valve seat 8 and the outer peripheral surface of the valve shaft 34 and flowing out through the second valve port 18 flows (leaks).

Further, as illustrated in FIG. 3, FIG. 4 and FIG. 7, a slight gap is defined between the tapered portion 73 of the first valve seat 70 and the tapered portion 76*c* of the recess 76. As a result, under a state in which the first valve seat 70 is fitted in the recess 76 of the valve main body 6, by a distance corresponding to the slight gap between the tapered portion 73 and the tapered portion 76*c* of the recess 76, the valve seat 70 is freely movable (displaced) by a length of from about several hundred micrometers to about several millimeters along inward and outward directions of the valve main body 6, and the fitting position of the valve seat 70 is adjustable.

Figure 10:
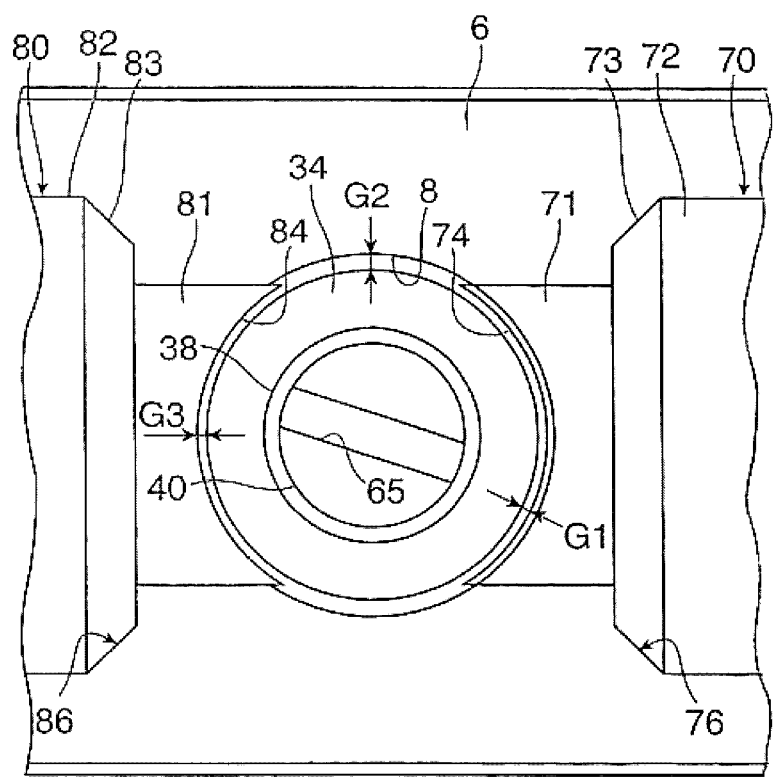
FIG. 10 is a configuration view for illustrating a relationship between the valve seat and a valve shaft.

As illustrated in FIG. 9(*b*), a concave portion 74 is formed at a distal end of the rectangular tube portion 71 of the first valve seat 70. The concave portion 74 is one example of a gap reducing portion having an arc shape in plan view, which forms part of a curved surface of a columnar shape corresponding to the valve seat 8 having a columnar shape in the valve main body 6. A curvature radius R of the concave portion 74 is set to a value substantially equal to a curvature radius of the valve seat 8 or a curvature radius of the valve shaft 34. In order to prevent biting of the valve shaft 34 to be rotated inside the valve seat 8, as described later, the valve seat 8 of the valve main body 6 defines a slight gap with respect to the outer peripheral surface of the valve shaft 34. As illustrated in FIG. 10, the concave portion 74 of the first valve seat 70 is fitted so as to protrude toward the valve shaft 34 side more than the valve seat 8 of the valve main body 6 or so as to be brought into contact with the outer peripheral surface of the valve shaft 34 under a state in which the first valve seat 70 is fitted to the valve main body 6. As a result, a gap G between the valve shaft 34 and an inner surface of the valve seat 8 of the valve main body 6 being a member opposed to the valve shaft 34 is partially set to a value reduced by the protruding amount of the concave portion 74 of the first valve seat 70 as compared to that of a gap between the valve shaft 34 and another portion of the valve seat 8. Thus, a gap G1 between the concave portion 74 of the first valve seat 70 and the valve shaft 34 is set to a desired value (G1<G2) smaller than (or a gap narrower than) a gap G2 between the valve shaft 34 and the inner surface of the valve seat 8. The gap G1 between the concave portion 74 of the first valve seat 70 and the valve shaft 34 may correspond to a state in which the concave portion 74 of the valve seat 70 is brought into contact with the valve shaft 34, that is, a state in which no gap is defined (the gap G1=0).

However, in a case in which the concave portion 74 of the first valve seat 70 is brought into contact with the valve shaft 34, there is a fear in that driving torque of the valve shaft 34 is increased due to contact resistance of the concave portion 74 when the valve shaft 34 is driven to rotate. Accordingly, a contact degree of the concave portion 74 of the first valve seat 70 with the valve shaft 34 is adjusted in consideration of rotational torque of the valve shaft 34. That is, the contact degree is adjusted to such an extent as to involve no increase in the driving torque of the valve shaft 34 or involve slight increase even when the driving torque is increased, and cause no trouble for rotation of the valve shaft 34.

As illustrated in FIG. 8, the first flow passage forming member 15 is made of metal such as SUS, and has a cylindrical shape having a relatively small thickness. The first flow passage forming member 15 has the first outflow port 7 formed therein to communicate with the first valve port 9 irrespective of shift of a position of the first valve seat 70.

Figure 11:
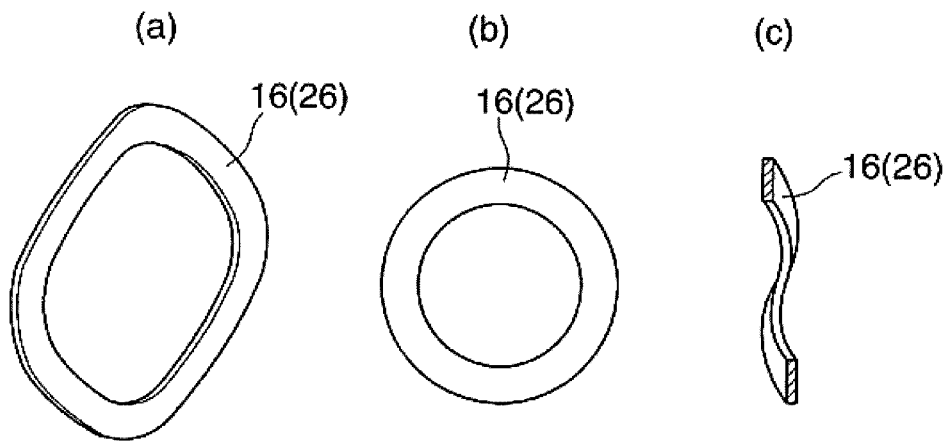
FIG. 11 are configuration views for illustrating a wave washer.

A first wave washer (corrugated washer) 16 is provided on an outer side of the cylindrical portion 72 of the first valve seat 70 along an axial direction thereof. The first wave washer 16 is one example of an elastic member configured to allow the first valve seat 70 to move in the direction of moving close to and away from the valve shaft 34 while allowing displacement of the first valve seat 70 in the direction of moving close to and away from the valve shaft 34. As illustrated in FIG. 11, the first wave washer 16 is made of, for example, stainless steel, iron, or phosphor bronze, and has an annular shape having a desired width when a front side thereof is projected. Further, a side surface of the first wave washer 16 is formed into a wavy (corrugated) shape, and the first wave washer 16 is elastically deformable in a thickness direction thereof. An elastic modulus of the first wave washer 16 is determined by, for example, the thickness, a material, or the number of waves of the first wave washer 16. The first wave washer 16 is received in the first pressure applying portion 94.

Figure 12:
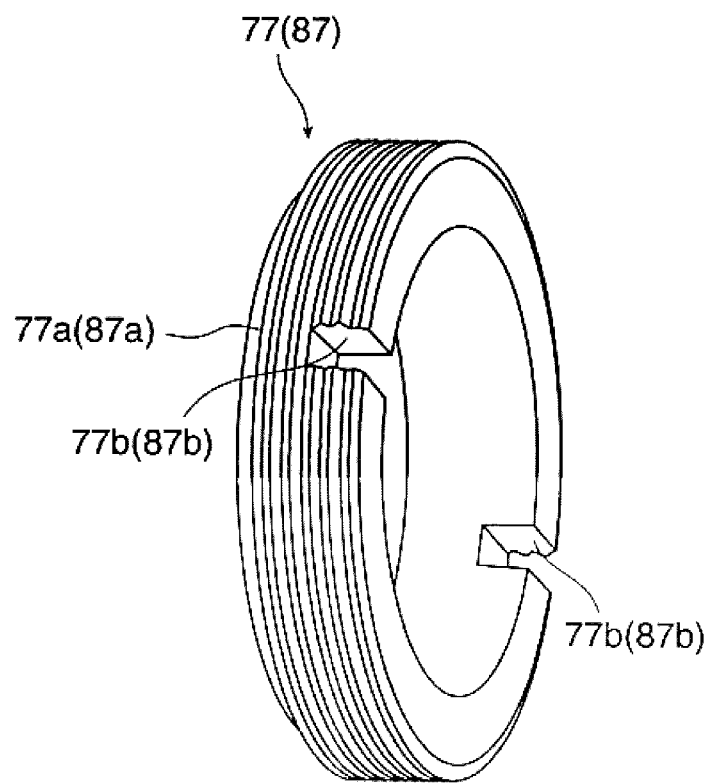
FIG. 12 is a perspective configuration view for illustrating an adjusting ring.

Moreover, a first adjusting ring 77 is arranged on an outer side of the first wave washer 16. The first adjusting ring 77 is one example of an adjusting member configured to adjust the gap G1 between the valve shaft 34 and the concave portion 74 of the first valve seat 70 via the first wave washer 16. As illustrated in FIG. 12, the first adjusting ring 77 is made of a synthetic resin having heat resistance or metal, and is formed of a cylindrical member having a relatively small length and a male thread 77*a* formed in an outer peripheral surface thereof. Recessed grooves 77*b* are formed in an outer end surface of the first adjusting ring 77 so as to be 180 degrees opposed to each other. When the first adjusting ring 77 is fastened and fitted into a female thread portion 78 formed in the valve main body 6, a jig (not shown) for adjusting a fastening amount is locked to the recessed grooves 77*b* so as to turn the first adjusting ring 77.

As illustrated in FIG. 6, the female thread portion 78 for fitting the first adjusting ring 77 is formed in the valve main body 6. A tapered portion 79 is formed at an opening end portion of the valve main body 6, and has a diameter increasing toward an outer periphery thereof. An O-ring 79*a* is interposed in the tapered portion 79.

The first adjusting ring 77 is configured to adjust an amount (distance) of pushing and moving the first valve seat 70 inward by the first adjusting ring 77 through adjustment of a fastening amount of the first adjusting ring 77 with respect to the female thread portion 78 of the valve main body 6. When the fastening amount of the first adjusting ring 70 is increased, as illustrated in FIG. 10, the first valve seat 70 is pushed by the first adjusting ring 77 via the first wave washer 16 so that the concave portion 74 protrudes from an inner peripheral surface of the valve seat 8 and is displaced in a direction of approaching the valve shaft 34. Thus, the gap G1 between the concave portion 74 and the valve shaft 34 is reduced. Further, when the fastening amount of the first adjusting ring 77 is set to a small amount in advance, the distance of pushing and moving the first valve seat 70 by the first adjusting ring 77 is reduced. As a result, the first valve seat 70 is arranged apart from the valve shaft 34, and the gap G1 between the concave portion 74 of the first valve seat 70 and the valve shaft 34 is relatively increased. The male thread 77*a* of the first adjusting ring 77 and the female thread portion 78 of the valve main body 6 are each set to have a small pitch. With this configuration, a protruding amount of the first valve seat 70 can be finely adjusted.

Further, as illustrated in FIG. 3 and FIG. 4, a first flange member 10 as an example of a connecting member, which is configured to connect a pipe, or the like (not shown), for allowing outflow of the fluid, is mounted to one side surface of the valve main body 6 with four hexagon socket head cap screws 11. In FIG. 8, a reference symbol 11*a* denotes a screw hole in which the hexagon socket head cap screw 11 is fastened. Similarly to the valve main body 6, the first flange member 10 is made of metal, for example, SUS. The first flange member 10 includes a flange portion 12, an insertion portion 13, and a pipe connecting portion 14. The flange portion 12 has a side surface having substantially the same rectangular shape as the side surface of the valve main body 6. The insertion portion 13 has a cylindrical shape and protrudes from an inner surface of the flange portion 12 (see FIG. 3). The pipe connecting portion 14 has a substantially cylindrical shape having a large thickness and protrudes from an outer surface of the flange portion 12. A pipe (not shown) is connected to the pipe connecting portion 14. As illustrated in FIG. 4, a space between the insertion portion 13 of the first flange member 10 and the first flow passage forming member 15 is sealed by an O-ring 13a. A recessed groove 13b configured to receive the O-ring 13a is formed in an inner peripheral surface of the insertion portion 13 of the first flange member 10. An inner periphery of the pipe connecting portion 14 is set to, for example, Rc ½ being a standard for a tapered female thread having a bore diameter of about 21 mm, or a female thread having a diameter of about 0.58 inches. The shape of the pipe connecting portion 14 is not limited to the tapered female thread or the female thread. The pipe connecting portion 14 may have, for example, a tube fitting shape that allows a tube to be fitted thereto. The pipe connecting portion 14 may have any shape as long as the pipe connecting portion 14 enables inflow of a fluid through the first outflow port 7.

As illustrated in FIG. 3 and FIG. 4, second inflow port 17 and a second valve port 18 are formed in another side surface (right side surface in FIG. 3 and FIG. 4) of the valve main body 6. The second outflow port 17 allows outflow of a fluid. The second valve port 18 has a rectangular cross section, and communicates with the valve seat 8 having the columnar space.

In the first embodiment of the present invention, instead of directly forming the second outflow port 17 and the second valve port 18 in the valve main body 6, the second inflow port 17 and the second valve port 18 are formed in a second valve seat 80 that forms the second valve port 18 as one example of the valve port forming member and a second flow passage forming member 25 that forms the second outflow port 17 are fitted to the valve main body 6, thereby providing the second outflow port 17 and the second valve port 18.

The second valve seat 80 has a configuration similar to the configuration of the first valve seat 70 as illustrated in FIG. 9 with the reference symbol of the second valve seat 80 put in parentheses. That is, the second valve seat 80 integrally includes a rectangular tube portion 81, a cylindrical portion 82, and a tapered portion 83. The rectangular tube portion 81 has a rectangular tube shape and is provided inside the valve main body 6. The cylindrical portion 82 has a cylindrical shape and is provided outside the valve main body 6. The tapered portion 83 has an outer diameter increasing toward the cylindrical portion 82 side and is arranged between the rectangular tube portion 81 and the cylindrical portion 82. The second valve port 18 is formed in the rectangular tube portion 81 of the second valve seat 80, and has a rectangular prism shape having a rectangular cross section (square cross section in the first embodiment of the present invention). Further, one end portion of the second flow passage forming member 25 forming the second outflow port 17 is arranged so as to be inserted in a sealed state into the cylindrical portion 82 of the second valve seat 80. As illustrated in FIG. 4, a space between the cylindrical portion 82 of the second valve seat 80 and the second flow passage forming member 25 is sealed by an O-ring 25a. As illustrated in FIG. 9, a recessed groove 85 configured to receive the O-ring 25a is formed in an inner peripheral surface of the cylindrical portion 82 of the second valve seat 80.

As illustrated in FIG. 6 and FIG. 7, a recess 86 is formed in the valve main body 6 by, for example, machining. The recess 86 has a shape corresponding to an outer shape of the second valve seat 80 and similar to the shape of the valve seat 80. The recess 86 includes a rectangular tube portion 86a corresponding to the rectangular tube portion 81 of the second valve seat 80, a cylindrical portion 86b corresponding to the cylindrical portion 82, and a tapered portion 86c corresponding to the tapered portion 83. A length of the cylindrical portion 86b of the valve main body 6 is set larger than a length of the cylindrical portion 82 of the second valve seat 80. As described later, the cylindrical portion 86b of the valve main body 6 forms a second pressure applying portion 96. The second valve seat 80 is fitted to the recess 86 of the valve main body 6 so as to be freely movable, although by a slight distance, in a direction of moving close to and away from a valve shaft 34 serving as a valve body.

Under a state in which the second valve seat 80 is fitted to the recess 86 of the valve main body 6, a slight gap is defined between the rectangular tube portion 81 of the second valve seat 80 and the rectangular tube portion 86a of the valve main body 6. A fluid having flowed into the valve seat 8 can flow into a region around an outer periphery of the second valve seat 80 through the slight gap. Further, the fluid having flowed into the region around the outer periphery of the second valve seat 80 is led into the second pressure applying portion 96 being a space defined on an outer side of the cylindrical portion 82 of the second valve seat 80. The second pressure applying portion 96 is configured to apply a pressure of the fluid to a surface 80a of the second valve seat 80 opposite to the valve shaft 34. The fluid flowing into the valve seat 8 is a fluid flowing out through the first valve port 9 as well as a fluid flowing out through the second valve port 18. The second pressure applying portion 96 is partitioned under a state in which the second flow passage forming member 25 seals the second pressure applying portion 96 with respect to the second outflow port 17.

The pressure of the fluid, which is to be applied to the valve shaft 34 arranged inside the valve seat 8, depends on a flow rate of the fluid determined by an opening/closing degree of the valve shaft 34. The fluid flowing into the valve seat 8 also flows (leaks) through the first valve port 9 and the second valve port 18 into a slight gap defined between the valve seat 8 and an outer peripheral surface of the valve shaft 34. Therefore, into the second pressure applying portion 96 adapted for the second valve seat 80, not only the fluid flowing out through the second valve port 18 flows (leaks), but also the fluid flowing into the slight gap defined between the valve seat 8 and the outer peripheral surface of the valve shaft 34 and flowing out through the first valve port 9 flows (leaks).

Further, as illustrated in FIG. 3 and FIG. 4, a slight gap is defined between the tapered portion 83 of the second valve seat 80 and the tapered portion 86c of the recess 86. As a result, under a state in which the second valve seat 80 is fitted in the recess 86 of the valve main body 6, by a distance corresponding to the slight gap between the tapered portion 83 and the tapered portion 86c of the recess 86, the valve seat 80 is freely movable by a length of from about several hundred micrometers to about several millimeters along inward and outward directions of the valve main body 6, and the fitting position of the valve seat 80 is adjustable. The second valve seat 80 is made of the same material as that for the first valve seat 70.

As illustrated in FIG. 9(*b*), a concave portion 84 is formed at a distal end of the rectangular tube portion 81 of the second valve seat 80. The concave portion 84 is one example of a gap reducing portion having an arc shape in plan view, which forms part of a curved surface of a columnar shape corresponding to the valve seat 8 having a columnar shape in the valve main body 6. A curvature radius R of the concave portion 84 is set to a value substantially equal to a curvature radius of the valve seat 8 or a curvature radius of a valve shaft 34. In order to prevent biting of the valve shaft 34 to be rotated inside the valve seat 8, as described later, the valve seat 8 of the valve main body 6 defines a slight gap with respect to an outer peripheral surface of the valve shaft 34. The concave portion 84 of the second valve seat 80 is fitted so as to protrude toward the valve shaft 34 side more than the valve seat 8 of the valve main body 6 or so as to be brought into contact with the outer peripheral surface of the valve shaft 34 under a state in which the second valve seat 70 is fitted to the valve main body 6. As a result, a gap G between the valve shaft 34 and an inner surface of the valve seat 8 of the valve main body 6 being a member opposed to the valve shaft 34 is partially set to a value reduced by the protruding amount of the concave portion 84 of the second valve seat 80 as compared to that of a gap between the valve shaft 34 and another portion of the valve seat 8. Thus, a gap G3 between the concave portion 84 of the second valve seat 80 and the valve shaft 34 is set to a desired value (G3<G2) smaller than (or a gap narrower than) the gap G2 between the valve shaft 34 and the inner surface of the valve seat 8. Further, the gap G3 between the concave portion 84 of the second valve seat 80 and the valve shaft 34 may correspond to a state in which the concave portion 84 of the valve seat 80 is brought into contact with the valve shaft 34, that is, a state in which no gap is defined (the gap G3=0).

However, in a case in which the concave portion 84 of the second valve seat 80 is brought into contact with the valve shaft 34, there is a fear in that driving torque of the valve shaft 34 is increased due to contact resistance of the concave portion 84 when the valve shaft 34 is driven to rotate. Accordingly, a contact degree of the concave portion 84 of the second valve seat 80 with the valve shaft 34 is adjusted in consideration of the rotational torque of the valve shaft 34. That is, the contact degree is adjusted to such an extent as to involve no increase in the driving torque of the valve shaft 34 or involve slight increase even when the driving torque is increased, and cause no trouble for rotation of the valve shaft 34.

A second wave washer (corrugated washer) 26 is provided on an outer side of the cylindrical portion 82 of the second valve seat 80. The second wave washer 26 is one example of an elastic member configured to push and move the second valve seat 80 in a direction of coming into contact with the valve shaft 34 while allowing displacement of the second valve seat 80 in a direction of moving close to and away from the valve shaft 34. As illustrated in FIG. 11, the second wave washer 26 is made of, for example, stainless steel, iron, or phosphor bronze, and has an annular shape having a desired width when a front side thereof is projected. Further, a side surface of the second wave washer 26 is formed into a wavy (corrugated) shape, and the second wave washer 26 is elastically deformable in a thickness direction thereof. An elastic modulus of the second wave washer 26 is determined by, for example, the thickness, a material, or the number of waves of the second wave washer 26. The second wave washer 26 equivalent to the first wave washer 16 is used.

Moreover, a second adjusting ring 87 is arranged on an outer side of the second wave washer 26. The second adjusting ring 87 is one example of an adjusting member configured to adjust the gap G3 between the valve shaft 34 and the concave portion 84 of the second valve seat 80 via the second wave washer 26. As illustrated in FIG. 12, the second adjusting ring 87 is made of a synthetic resin having heat resistance or metal, and is formed of a cylindrical member having a relatively small length and a male thread 87*a* formed in an outer peripheral surface thereof. Recessed grooves 87*b* are formed in an outer end surface of the second adjusting ring 87 so as to be 180 degrees opposed to each other. When the second adjusting ring 87 is fastened and fitted into a female thread portion 88 formed in the valve main body 6, a jig (not shown) for adjusting a fastening amount is locked to the recessed grooves 87*b* so as to turn the second adjusting ring 87.

As illustrated in FIG. 6 and FIG. 7, a second female thread portion 88 for fitting the second adjusting ring 87 is formed in the valve main body 6. A tapered portion 89 is formed at an opening end portion of the valve main body 6 and has a diameter increasing toward an outer periphery thereof. An O-ring 89*a* is interposed in the tapered portion 89.

The second adjusting ring 87 is configured to adjust an amount (distance) of pushing and moving the second valve seat 80 inward by the second adjusting ring 87 via the second wave washer 26 through adjustment of a fastening amount of the second adjusting ring 87 with respect to the female thread portion 88 of the valve main body 6. When the fastening amount of the second adjusting ring 87 is increased, as illustrated in FIG. 10, the second valve seat 80 is pushed by the second adjusting ring 87 via the second wave washer 26 so that the concave portion 84 protrudes from an inner peripheral surface of the valve seat 8 and is displaced in a direction of approaching the valve shaft 34. Thus, the gap G3 between the concave portion 84 and the valve shaft 34 is reduced. Further, when the fastening amount of the second adjusting ring 87 is set to a small amount in advance, the distance of pushing and moving the second valve seat 80 by the second adjusting ring 87 is reduced. As a result, the second valve seat 80 is arranged apart from the valve shaft 34, and the gap G3 between the concave portion 84 of the second valve seat 80 and the valve shaft 34 is relatively increased. The male thread 87*a* of the second adjusting ring 87 and the female thread portion 88 of the valve main body 6 are each set to have a small pitch. With this configuration, a protruding amount of the second valve seat 80 can be finely adjusted.

As illustrated in FIG. 3 and FIG. 4, a second flange member 19 as an example of a connecting member for connecting a pipe (not shown) which allows outflow of the fluid is mounted to the another side surface of the valve main body 6 with four hexagon socket head cap screws 20. Similarly to the first flange member 10, the second flange member 19 is made of metal, for example, SUS. The second flange member 19 has a flange portion 21, an insertion portion 22, and a pipe connecting portion 23. The flange portion 21 has a side surface having the same rectangular shape as the side surface of the valve main body 6. The insertion portion 22 has a cylindrical shape and protrudes from an inner surface of the flange portion 21. The pipe connecting portion 23 has a substantially cylindrical shape having a large thickness and protrudes from an outer surface of the flange portion 21. A pipe (not shown) is connected to the pipe connecting portion 23. As illustrated in FIG. 4, a space between the insertion portion 22 of the second flange member 19 and the second flow passage forming member 25 is sealed by an O-ring 22a. A recessed groove 22b configured to receive the O-ring 22a is formed in an inner peripheral surface of the insertion portion 22 of the second flange member 19. An inner periphery of the pipe connecting portion 23 is set to, for example, Rc ½ being a standard for a tapered female thread having a bore diameter of about 21 mm, or a female thread having a diameter of about 0.58 inches. Similarly to the pipe connecting portion 14, the shape of the pipe connecting portion 23 is not limited to the tapered female thread or the female thread. The pipe connecting portion 23 may have, for example, a tube fitting shape that allows a tube to be fitted thereto. The pipe connecting portion 23 may have any shape as long as the pipe connecting portion 23 enables inflow of a fluid through the second outflow port 17.

In the embodiment illustrated in FIG. 3 and FIG. 4, description is made of the case in which the first flow passage forming member 15 is long enough to overlap the first flange member 10 and the second flow passage forming member 25 is long enough to overlap the second flange member 19, but the first flow passage forming member 15 and the second flow passage forming member 25 may each have a smaller length than that in this case. That is, as illustrated in FIG. 7, the first flow passage forming member 15 and the second flow passage forming member 25 may be set to have such a relatively small length as to reach a first sealing member 97 and a second sealing member 98 arranged on an inner side of the first adjusting ring 77 and an inner side of the second adjusting ring 87, respectively. Similarly to the first wave washer 16 and the second wave washer 26, the first adjusting ring 77 and the second adjusting ring 87 are arranged inside the first and second pressure applying portions 96, respectively. Recessed grooves 97a and 98a are formed in an inner peripheral surface and an outer peripheral surface of each of the first adjusting ring 77 and the second adjusting ring 87. Each of the recessed grooves 97a and 98a is configured to receive an O-ring (not shown) configured to seal a space between the first flow passage forming member 15 and the second flow passage forming member 25. Further, instead of sealing the first flange member 10 and the second flange member 19 by the O-ring 89a interposed in the tapered portion 89 formed in the valve main body 6, as illustrated in FIG. 7, the first flange member 10 and the second flange member 19 may be sealed by the O-rings 79a and 89a fitted in recessed grooves 12a and 21a respectively formed in an inner surface of the flange portion 12 of the first flange member 10 and an inner surface of the flange portion 21 of the second flange member 19.

As the fluid, for example, water (such as pure water) adjusted to pressure of from 0 MPa to 1 MPa and within a temperature range of from about 0° C. to about 80° C. is suitably used. Further, as the fluid, for example, within a temperature range of from about −20° C. to about +120° C., there is used a fluid such a fluorine-based inert liquid, for example, Fluorinert (trademark) and ethylene glycol, which are neither frozen at a temperature of about −20° C. nor boiled at a temperature of about +120° C.

Further, as illustrated in FIG. 3, in a lower end surface of the valve main body 6, an inflow port 26 having a circular cross section as the third valve port is opened. The inflow port 26 allows inflow of a fluid. A third flange member 27 as an example of a connecting member for connecting a pipe (not shown) which allows inflow of the fluid is mounted to the lower end surface of the valve main body 6 with four hexagon socket head cap screws 28. A cylindrical portion 26b is opened in a lower end portion of the inflow port 26 through a tapered portion 26a. The tapered portion 26a is tapered and increased in diameter so as to allow the third flange member 27 to be fitted thereto. As illustrated in FIG. 7, without forming the tapered portion 26a, only the cylindrical portion 26b may be formed at the lower end portion of the inflow port 26. Similarly to the first and second flange members 10 and 19, the third flange member 27 is made of metal, for example, SUS. The third flange member 27 has a flange portion 29, an insertion portion 30, and a pipe connecting portion 31. The flange portion 29 has a planar surface having a rectangular shape, which is smaller than the lower end surface of the valve main body 6. The insertion portion 30 has a cylindrical shape and protrudes from an upper end surface of the flange portion 29. The pipe connecting portion 31 has a substantially cylindrical shape having a large thickness and protrudes from a lower end surface of the flange portion 29. A pipe (not shown) is connected to the pipe connecting portion 31. An inner periphery of the pipe connecting portion 31 is set to, for example, Rc ½ being a standard for a tapered female thread having a bore diameter of about 21 mm and a female thread having a diameter of about 0.58 inches. An inner peripheral end on a lower end of the third inflow port 26 of the valve main body 6 has a chamfer 33 to allow an O-ring 32 to be mounted between the third outflow port 26 of the valve main body 6 and the flange portion 29 of the third flange member 27. The shape of the pipe connecting portion 31 is not limited to the tapered female thread or the female thread. The pipe connecting portion 31 may have, for example, a tube fitting shape that allows a tube to be fitted thereto. The pipe connecting portion 31 may have any shape as long as the pipe connecting portion 31 enables inflow of a fluid through the inflow port 26. Further, as illustrated in FIG. 7, similarly to the first flange member 10 and the second flange member 19, the sealing structure for the flange portion 29 of the third flange member 27 may be achieved through sealing by an O-ring fitted in a recessed groove (not shown) formed in an inner surface of the flange portion 29.

Figure 13:
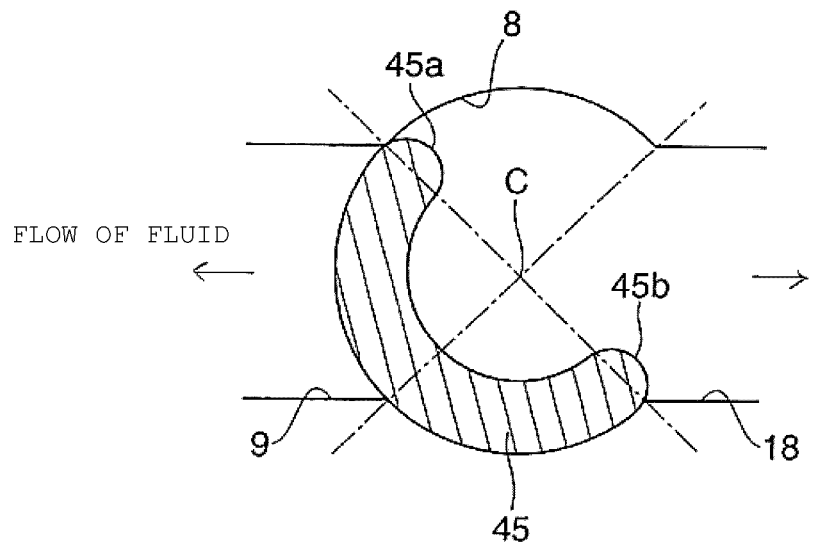
FIG. 13 are configuration views for illustrating a motion of the valve shaft.
Figure 13:
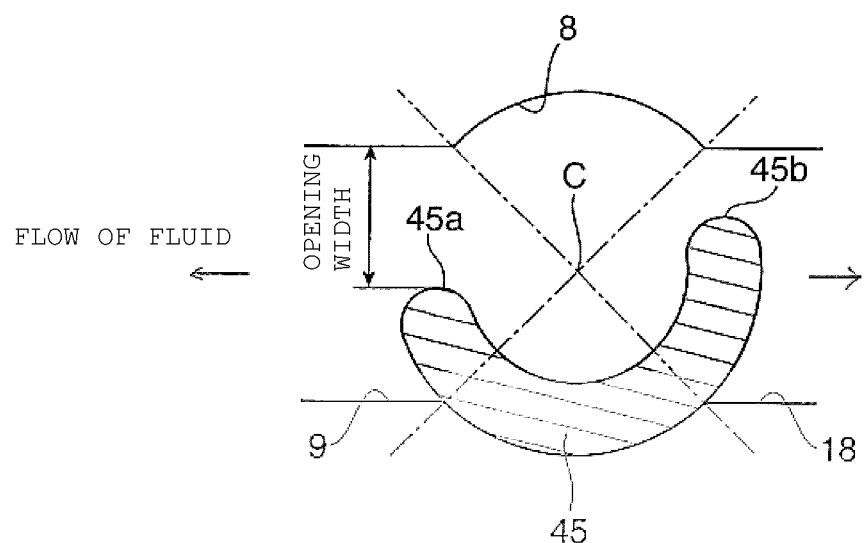

The valve seat 8 is formed in a center of the valve main body 6. The valve seat 8 forms the first valve port 9 having a rectangular cross section and the second valve port 18 having a rectangular cross section when the first valve seat 70 and the second valve seat 80 are fitted to the valve main body 6. The valve seat 8 has a space having a columnar shape corresponding to an outer shape of a valve body to be described later. Further, part of the valve seat 8 is formed by the first valve seat 70 and the second valve seat 80. The valve seat 8 having a columnar shape is provided in a state of penetrating an upper end surface of the valve main body 6. As illustrated in FIG. 13, the first valve port 9 and the second valve port 18 provided to the valve main body 6 are arranged in an axial symmetrical manner with respect to a center axis (rotation axis) C of the valve seat 8 having a columnar shape. More specifically, the first valve port 9 and the second valve port 18 are arranged so as to be orthogonal to the valve seat 8 having a columnar shape. One end edge of the first valve port 9 is opened in a position opposed to another end edge of the second valve port 18 through the center axis C, that is, in a position different by 180°. Further, another end edge of the first valve port 9 is opened in a position opposed to one end edge of the second valve port 18 through the center axis C, that is, in a position different by 180°. In FIG. 13, for convenience, illustration of a gap between the valve seat 8 and the valve shaft 34 is omitted.

Further, as illustrated in FIG. 3 and FIG. 4, the first valve port 9 and the second valve port 18 are openings each having a rectangular cross section such as a square cross section and are formed through fitting through fitting of the first valve seat 70 and the second valve seat 80 to the valve main body 6 as described above. A length of one side of the first valve port 9 and the second valve port 18 is set to be smaller than a diameter of the first outflow port 7 and the second outflow port 17. The first valve port 9 and the second valve port 18 have a cross section having a rectangular shape inscribed in the first outflow port 7 and the second outflow port 17.

Figure 14:
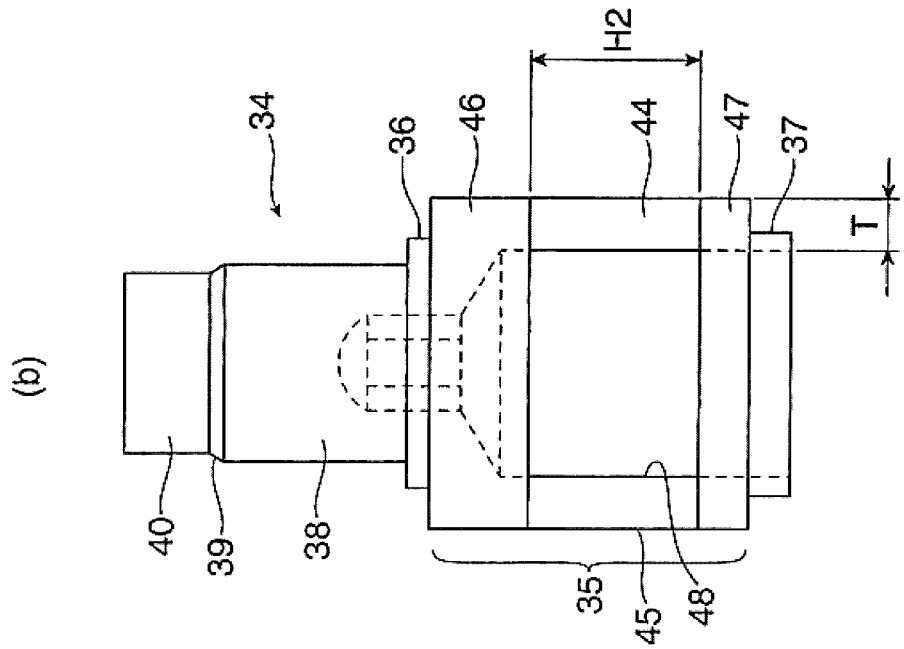
FIG. 14 are configuration views for illustrating the valve shaft.
Figure 14:
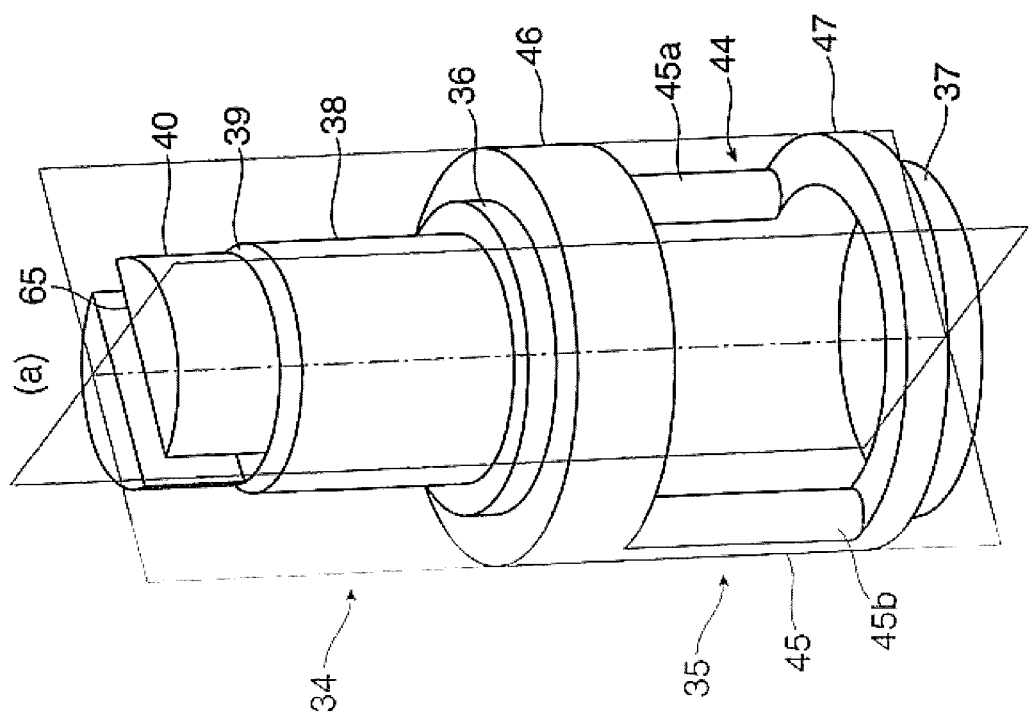

As illustrated in FIG. 14, a valve shaft 34 as one example of the valve body has an outer shape obtained by forming metal, for example, SUS, into a substantially columnar shape. The valve shaft 34 mainly includes a valve body portion 35, upper and lower shaft support parts 36 and 37, a sealing portion 38, and a coupling portion 40, which are integrally provided. The valve body portion 35 functions as a valve body. The upper and lower shaft support parts 36 and 37 are provided above and below the valve body portion 35, respectively, and support the valve shaft 34 in a freely rotatable manner. The sealing portion 38 is provided to an upper portion of the upper shaft support portion 36. The coupling portion 40 is provided to an upper portion of the sealing portion 38 through intermediation of a tapered portion 39.

The upper and lower shaft support parts 36 and 37 each have a cylindrical shape having an outer diameter smaller than that of the valve body portion 35 and having an equal or a different diameter. A length of the lower shaft support portion 37 in an axial direction is set to be slightly larger than that of the upper shaft support portion 36. As illustrated in FIG. 3, the lower shaft support portion 37 is supported in a freely rotatable manner through intermediation of a bearing 41 by a lower end of the valve seat 8 provided to the valve main body 6. An annular support portion 42 supporting the bearing 41 is provided at a lower portion of the valve seat 8 so as to protrude toward an inner periphery. The bearing 41, the support portion 42, and the third valve port 26 are set to have an equal inner diameter, and are configured to allow inflow of the fluid for temperature control to an inside of the valve body portion 35 with little resistance. Meanwhile, a thrust washer 43 is mounted to the upper shaft support portion 36 to reduce a load generated by the valve shaft 34 pressed by a sealing case 53 to be described later.

Further, as illustrated in FIG. 3 and FIG. 14 (b), the valve body portion 35 has a cylindrical shape having an opening formed therein. The opening 44 has a substantially half-cylindrical shape with an opening height H2, which is smaller than an opening height H1 of the first and second valve ports 9 and 18. A valve operating portion 45 having the opening 44 of the valve body portion 35 has a half-cylindrical shape (substantially half-cylindrical shape of a cylindrical portion excluding the opening 44) with a predetermined central angle α (for example, about) 190°. The valve operating portion 45 is arranged in a freely rotatable manner in the valve seat 8 and held in non-contact with an inner peripheral surface of the valve seat 8 through a slight gap to prevent metal-to-metal biting. Accordingly, with the valve body portion 35 positioned above and below the opening 44 included, the valve operating portion 45 simultaneously switches the first valve port 9 from a closed state to an opened state and the second valve port 18 from an opened state to a closed state in a reverse direction. As illustrated in FIG. 14, upper and lower valve shaft parts 46 and 47 arranged above and below the valve operating portion 45 each have a cylindrical shape having an outer diameter equal to that of the valve operating portion 45, and are held in non-contact with the inner peripheral surface of the valve seat 8 in a freely rotatable manner through a slight gap. In an inside over the valve operating portion 45, the upper and lower valve shaft parts 46 and 47, and the sealing portion 38, a space 48 is provided in a state of penetrating the valve shaft 34 toward a lower edge thereof. The space 48 has a columnar shape.

Further, a cross section of each of both end surfaces 45a and 45b of the valve operating portion 45 in a circumferential direction (rotation direction), which is taken along a direction intersecting (orthogonal to) the center axis C, has a curved-surface shape. More specifically, as illustrated in FIG. 14, the cross section of each of the both end portions 45a and 45b of the valve operating portion 45 in the circumferential direction, which is taken along a direction intersecting the rotation axis C, has an arc shape being convex toward the opening 44. A curvature radius of each of the both end portions 45a and 45b is set to, for example, a half of a thickness T of the valve operating portion 45. As a result, a cross section of each of the both end portions 45a and 45b is a semicircular shape.

The cross section of each of the both end portions 45a and 45b of the valve operating portion 45 in the circumferential direction, which is taken along a direction intersecting the rotation axis C, is not limited to an arc shape. Each of the both end surfaces 45a and 45b in the circumferential direction (rotation direction) may have a curved-surface shape. As illustrated in FIG. 15(b), the cross section of each of the both end portions 45a and 45b of the valve operating portion 45 in the circumferential direction, which is taken along a direction intersecting the rotation axis C, may have a curved shape obtained by smoothly connecting a first curved portion 50, which is positioned on an outer peripheral side, and a second curved portion 51, which is positioned on an inner peripheral side and has a curvature radius smaller than that of the first curved portion 50.

Figure 15:
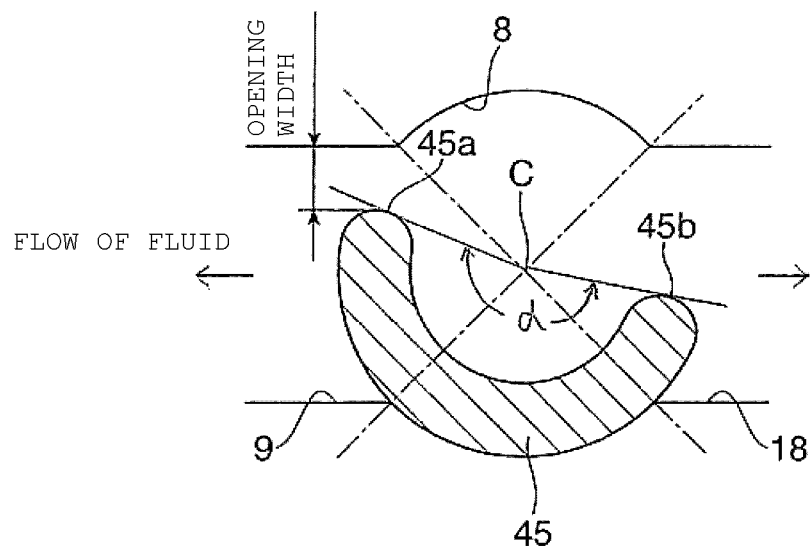
FIG. 15 are configuration views for illustrating the motion of the valve shaft.
Figure 15:
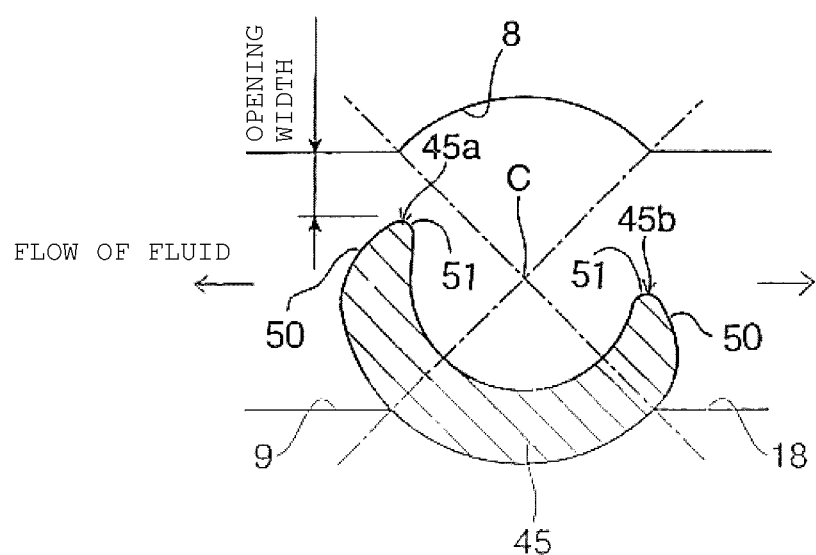

As illustrated in FIG. 15, when the valve shaft 34 is driven to rotate to open and close the first and second valve ports 9 and 18, in flows of the fluid, the both end portions 45a and 45b of the valve operating portion 45 in the circumferential direction are moved (rotated) so as to protrude from or retreat to the ends of the first and second valve ports 9 and 18 in the circumferential direction. Accordingly, the first and second valve ports 9 and 18 are switched from the opened state to the closed state, or from the closed state to the opened state. At this moment, it is desired that each of the both end portions 45a and 45b of the valve operating portion 45 in the circumferential direction have a cross section having a curved-surface shape so as to further linearly change opening areas of the first and second valve ports 9 and 18 with respect to a rotation angle of the valve shaft 34.

Figure 16:
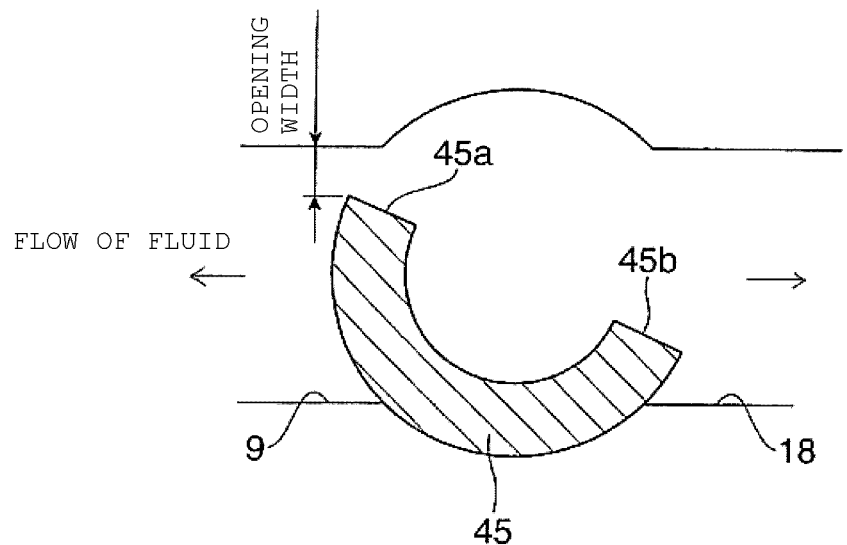
FIG. 16 are configuration views for illustrating the motion of the valve shaft.
Figure 16:
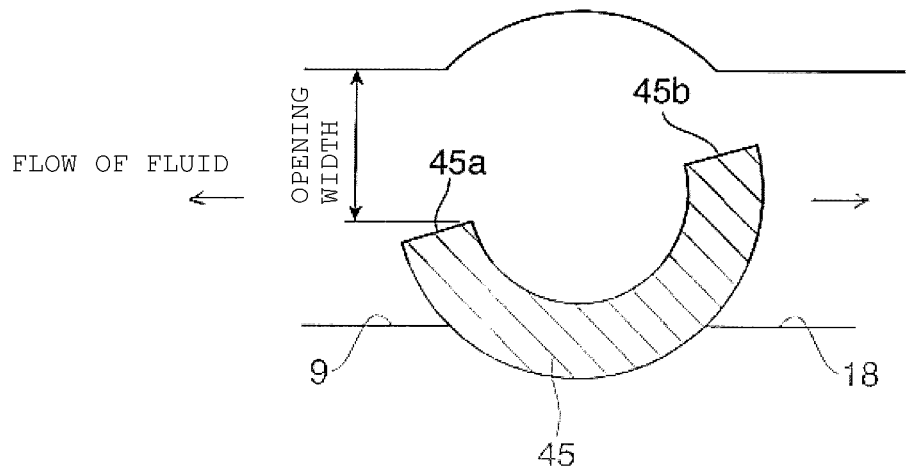

Further, the both end portions 45a and 45b of the valve operating portion 45 in the circumferential direction is not limited thereto. As illustrated in FIG. 16, the both end portions 45a and 45b may each have a flat-surface shape in a radial direction of the valve operating portion 45. Even in a case where each of the both end portions 45a and 45b of the valve operating portion 45 in the circumferential direction has the flat-surface shape, the opening areas of the first and second valve ports 9 and 18 with respect to the rotation angle of the valve shaft 34 can be substantially linearly changed.

As illustrated in FIG. 3, the sealing portion 4 is configured to seal the valve shaft 34 in a liquid-tight state. The sealing portion 4 has the sealing case 53 obtained by forming metal, for example, SUS, into a cylindrical shape. The sealing portion 4 has an insertion through hole 52 through which the valve shaft 34 is inserted. As illustrated in FIG. 6, the sealing case 53 is arranged in a recessed portion 54 that is formed in an upper end surface of the valve main body 6 and has a columnar shape. The sealing case 53 has such structure that a positional relationship between the sealing case 53 and the valve shaft 34 is determined through annular sealing members 55 and 56 and that the sealing case 53 is fixed through a positioning pin 58 (see FIG. 5) so as to be prevented from rotating with respect to a spacer member 59 to be described later. On an inner peripheral surface of the sealing case 53, the two annular sealing members 55 and 56 formed of, for example, O-rings for sealing the valve shaft 34 are arranged in a vertical direction. As the sealing members 55 and 56, for example, an O-ring made of ethylene-propylene rubber (EPDM) is used. The upper sealing member 56 is retained by a retaining member 56a. Further, the annular sealing member 57 formed of, for example, an O-ring seals the sealing case 53 with respect to the valve main body 6.

The coupling portion 5 is arranged between the valve main body 6, in which the sealing portion 4 is provided, and the actuator 3. The coupling portion 5 is configured to connect the valve shaft 34 and a rotation shaft (not shown), which allows the valve shaft 34 to be integrally rotated, to each other. The coupling portion 5 includes a spacer member 59, an adaptor plate 60, and a coupling member 62. The spacer member 59 is arranged between the sealing portion 4 and the actuator 3. The adaptor plate 60 is fixed to an upper portion of the spacer member 59. The coupling member 62 is accommodated in a space 61 having a columnar shape formed in a state of penetrating an inside of the spacer member 59 and the adaptor plate 60, and connects the valve shaft 34 and the rotation shaft (not shown) to each other. The spacer member 59 is obtained by forming metal, for example, SUS, into a parallelepiped shape, which has substantially the same planar shape as that of the valve main body 6 and a relatively small height. The spacer member 59 is fixed to both the valve main body 6 and the adaptor plate 60 through means such as screw fastening. Further, as illustrated in FIG. 2(c), the adaptor plate 60 is obtained by forming metal, for example, SUS, into a plate-like shape having a planar polygonal shape. The adaptor plate 60 is mounted to base 64 of the actuator 3 in a fixed state with hexagon socket head cap screws 63.

As illustrated in FIG. 3, the coupling member 62 is obtained by forming, for example, metal, a synthetic resin having heat resistance, or ceramics into a columnar shape. A recessed groove 65 is formed so as to penetrate an upper end of the valve shaft 34 in a horizontal direction. The valve shaft 34 is coupled and fixed to the coupling member 62 by fitting a projecting portion 66 of the coupling member 62 into the recessed groove 65. Meanwhile, a recessed groove 67 is formed in an upper end of the coupling member 62 so as to penetrate the coupling member 62 in a horizontal direction. The rotation shaft (not shown) is coupled and fixed to the coupling member 62 by fitting a projecting portion (not shown) into the recessed groove 67 of the coupling member 62. The spacer member 59 has an opening 68 formed in a side surface thereof for detecting leakage of a liquid through the insertion through hole 52 when the liquid leaks from the sealing members 55 and 56. The opening 68 is set to, for example, Rc 1/16 being a standard for a tapered female thread having a bore diameter of about 8 mm.

Figure 2:
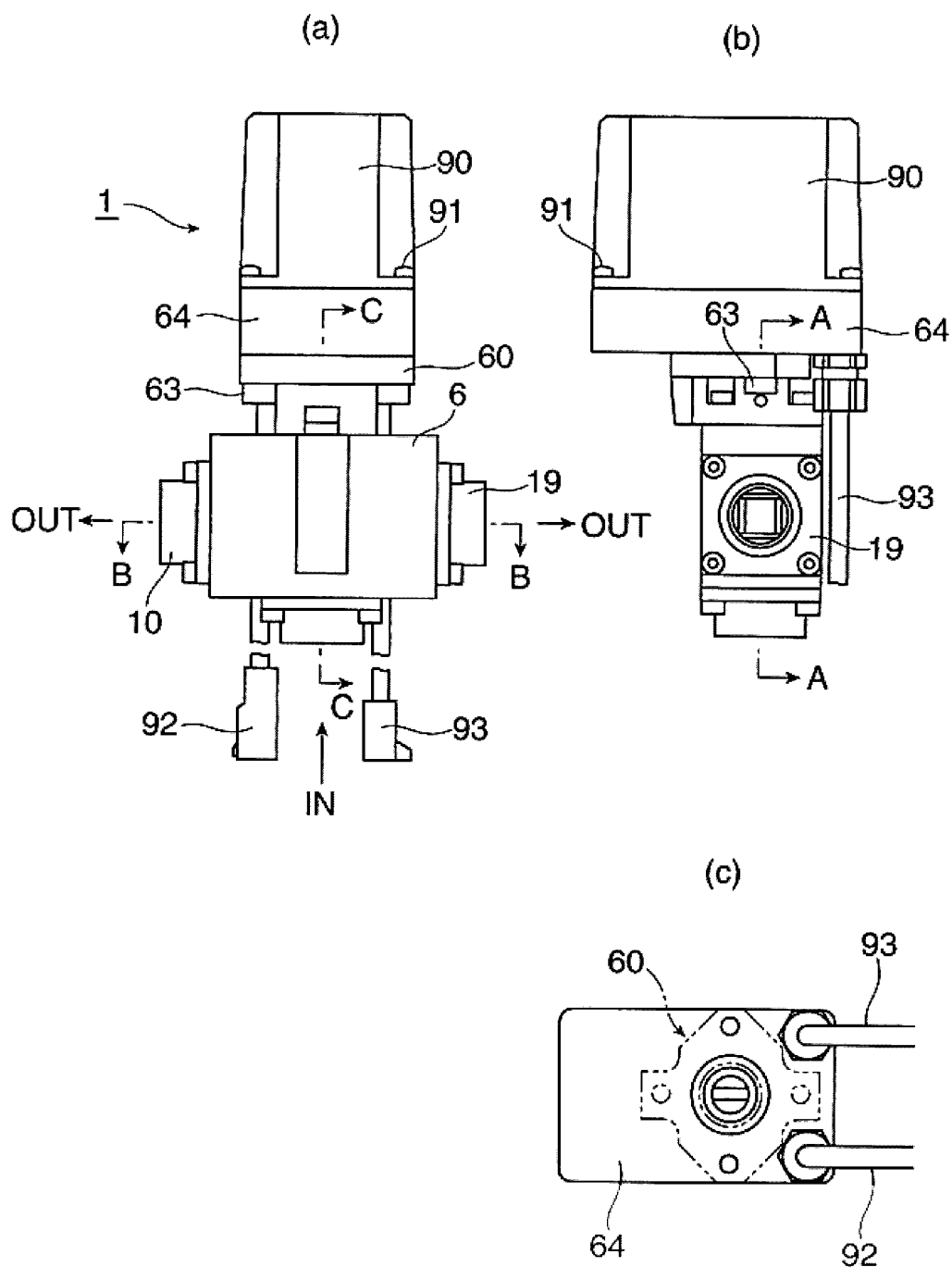
FIG. 2 are views including a front view, a right side view thereof, and a bottom view of an actuator, for illustrating the three-way motor valve as one example of the three-way valve for flow rate control according to the first embodiment of the present invention.

As illustrated in FIG. 2, the actuator 3 includes the base 64 having a planar surface having a rectangular shape. A casing 90 is mounted to an upper portion of the base 64 with screws 91. The casing 90 is constructed as a box body having a rectangular parallelepiped shape, which contains drive means including a stepping motor, an encoder, and the like. The drive means in the actuator 3 only needs to be capable of rotating the rotation shaft (not shown) in a desired direction with predetermined accuracy based on control signals, and configuration thereof is not limited. The drive means includes a stepping motor, a driving force transmission mechanism, and an angle sensor. The driving force transmission mechanism is configured to transmit a rotational driving force of the stepping motor to the rotation shaft through intermediation of driving force transmission means, for example, a gear. The angle sensor is, for example, an encoder or the like configured to detect a rotation angle of the rotation shaft.

In FIG. 2, a reference symbol 92 denotes a stepping motor-side cable, and a reference symbol 93 denotes an angle sensor-side cable. The stepping motor-side cable 92 and the angle sensor-side cable 93 are connected to a control device (not shown) configured to control the three-way motor valve 1.

<Operation of Three-way Motor Valve>

In the three-way motor valve 1 according to the embodiment of the present invention, the flow rate of the fluid is controlled as follows.

As illustrated in FIG. 8, at the time of assembly or adjustment for use, in the three-way motor valve 1, the first flange member 10 and the second flange member 19 are once removed from the valve main body 6 so that the adjusting rings 77 and 87 are exposed to the outside. Under this state, when the fastening amounts of the adjusting rings 77 and 87 with respect to the valve main body 6 are adjusted through use of the jig (not shown), as illustrated in FIG. 10, the protruding amounts of the first valve seat 70 and the second valve seat 80 from the valve seat 8 of the valve main body 6 are changed. When the fastening amounts of the adjusting rings 77 and 87 with respect to the valve main body 6 are increased, the concave portions 74 of the first valve seat 70 or the concave portion 84 of the second valve seat 80 protrudes from the inner peripheral surface of the valve seat 8 of the valve main body 6 so that the gap G1 between the outer peripheral surface of the valve shaft 34 and the concave portion 74 of the first valve seat 70 or the concave portion 84 of the second valve seat 80 is reduced. Accordingly, the outer peripheral surface of the valve shaft 34 is brought into contact with the concave portion 74 of the first valve seat 70 or the concave portion 84 of the second valve seat 80. Meanwhile, when the fastening amounts of the adjusting rings 77 and 87 with respect to the valve main body 6 are reduced, a protruding length of the concave portion 74 of the first valve seat 70 or the concave portion 84 of the second valve seat 80 from the inner peripheral surface of the valve seat 8 of the valve main body 6 is reduced so that the gap G1 between the outer peripheral surface of the valve shaft 34 and the concave portion 74 of the first valve seat 70 or the concave portion 84 of the second valve seat 80 is increased.

In the first embodiment of the present invention, the gap G1 between the outer peripheral surface of the valve shaft 34 and the concave portion 74 of the first valve seat 70 or the concave portion 84 of the second valve seat 80 is set to be smaller than 10 µm. However, the gap G1 between the outer peripheral surface of the valve shaft 34 and the concave portion 74 of the first valve seat 70 or the concave portion 84 of the second valve seat 80 is not limited to the above-mentioned value. The gap G1 may be set to a value smaller than the above-mentioned value, for example, may satisfy the gap G1=0 μm (contact state). Alternatively, the gap G1 may be set to 10 μm or more.

As illustrated in FIG. 1, the fluid flows into the three-way motor valve 1 from the third flange member 27 via a pipe (not shown), and the fluid flows out from the first flange member 10 and the second flange member 19 via pipes (not shown). Further, as illustrated in FIG. 13(a), for example, in an initial state before start of operation, the three-way motor valve 1 is brought into a state in which the valve operating portion 45 of the valve shaft 34 simultaneously closes (completely closes) the first valve port 9 and opens (completely opens) the second valve port 18.

As illustrated in FIG. 3, in the three-way motor valve 1, when the stepping motor (not shown) provided in the actuator 3 is driven to rotate by a predetermined amount, the rotation shaft (not shown) is driven to rotate in accordance with a rotation amount of the stepping motor. In the three-way motor valve 1, when the rotation shaft is driven to rotate, the valve shaft 34 coupled and fixed to the rotation shaft is rotated by an angle equivalent to the rotation amount (rotation angle) of the rotation shaft. The valve operating portion 45 is rotated in the valve seat 8 along with the rotation of the valve shaft 34. With this, as illustrated in FIG. 15(a), the one end portion 45a of the valve operating portion 45 in the circumferential direction gradually opens the first valve port 9. As a result, the fluid flowing in from the inflow port 26 flows into the valve seat 8 and flows out from a first housing member 10 through the first outflow port 7.

At this time, as illustrated in FIG. 15(a), another end portion 45b of the valve operating portion 45 in the circumferential direction opens the second valve port 18. Thus, the fluid having flowed into the valve seat 8 through the inflow port 26 is divided in accordance with a rotation amount of the valve shaft 34, and flows out from a second housing member 19 through the second outflow port 17.

As illustrated in FIG. 15(a), in the three-way motor valve 1, when the valve shaft 34 is driven to rotate, and one end portion 45a of the valve operating portion 45 in the circumferential direction gradually opens the first valve port 9, the fluid flows through the valve seat 8 and the valve shaft 34, and is supplied to the outside through the first valve port 9 and the second valve port 18 and through the first outflow port 7 and the second outflow port 17.

Further, in the three-way motor valve 1, each of the both end portions 45a and 45b of the valve operating portion 45 in the circumferential direction has a cross section having a curved-surface shape or a planar shape. Thus, the opening areas of the first and second valve ports 9 and 18 can be linearly changed with respect to the rotation angle of the valve shaft 34. Further, it is conceivable that the fluid regulated in flow rate by the both end portions 45a and 45b of the valve operating portion 45 flow in a form of a nearly laminar flow. Therefore, the distribution ratio (flow rate) between the fluid can be controlled with high accuracy in accordance with the opening areas of the first valve port 9 and the second valve port 18.

In the three-way motor valve 1 according to the first embodiment of the present invention, as described above, under an initial state, the valve operating portion 45 of the valve shaft 34 simultaneously closes (completely closes) the first valve port 9 and opens (completely opens) the second valve port 18.

At this time, in the three-way motor valve 1, when the valve operating portion 45 of the valve shaft 34 closes (completely closes) the first valve port 9, ideally, the flow rate of the fluid should be zero.

However, as illustrated in FIG. 10, in the three-way motor valve 1, in order to prevent metal-to-metal biting of the valve shaft 34 into the inner peripheral surface of the valve seat 8, the valve shaft 34 is provided in a freely rotatable manner so as to be held in non-contact with the valve seat 8 with a slight gap between the outer peripheral surface of the valve shaft 34 and the inner peripheral surface of the valve seat 8. As a result, the slight gap G2 is defined between the outer peripheral surface of the valve shaft 34 and the inner peripheral surface of the valve seat 8. Accordingly, in the three-way motor valve 1, even when the valve operating portion 45 of the valve shaft 34 closes (completely closes) the first valve port 9, the flow rate of the fluid does not become zero, and a small amount of the fluid flows to the second valve port 18 side through the slight gap G2 defined between the outer peripheral surface of the valve shaft 34 and the inner peripheral surface of the valve seat 8.

Incidentally, in the three-way motor valve 1 according to the first embodiment of the present invention, as illustrated in FIG. 10, the first valve seat 70 and the second valve seat 80 include the concave portion 74 and the concave portion 84, respectively. The concave portion 74 or the concave portion 84 protrudes from the inner peripheral surface of the valve seat 8 toward the valve shaft 34 side, thereby partially reducing the gap G1 between the outer peripheral surface of the valve shaft 34 and the inner peripheral surface of the valve seat 8.

Therefore, in the three-way motor valve 1, in order to prevent metal-to-metal biting of the valve shaft 34 into the inner peripheral surface of the valve seat 8, even when the valve shaft 34 is provided in a freely rotatable manner so as to be held in non-contact with the valve seat 8 with the slight gap between the outer peripheral surface of the valve shaft 34 and the inner peripheral surface of the valve seat 8, inflow of the fluid through the first valve port 9 into the slight gap G2 defined between the outer peripheral surface of the valve shaft 34 and the inner peripheral surface of the valve seat 8 is significantly restricted and suppressed by the gap G1 that is a region corresponding to a partially reduced gap between the outer peripheral surface of the valve shaft 34 and the inner peripheral surface of the valve seat 8.

Accordingly, the three-way motor valve 1 can significantly suppress leakage of the fluid when the three-way motor valve 1 completely closes the valve port as compared to a three-way motor valve that does not include the concave portions 74 and 84 formed to partially reduce the gap between the valve shaft 34 and the first valve seat 70, which is opposed to the valve shaft 34, and the gap between the valve shaft 34 and the second valve seat 80, which is opposed to the valve shaft 34.

Preferably, the three-way motor valve 1 according to the first embodiment of the present invention can significantly reduce the gaps G1 and G2 through contact of the concave portion 74 of the first valve seat 70 and the concave portion 84 of the second valve seat 80 with the outer peripheral surface of the valve shaft 34, thereby significantly suppressing leakage of the fluid when the three-way motor valve 1 completely closes the valve port.

Further, similarly, the three-way motor valve 1 can significantly suppress leakage and outflow of the fluid through the second valve port 18 to another first valve port 9 side even when the valve operating portion 45 of the valve shaft 34 closes (completely closes) the second valve port 18.

Moreover, as illustrated in FIG. 3, in the first embodiment of the present invention, the first pressure applying portion 94 and the second pressure applying portion 96 are respectively provided to the surface 70a of the first valve seat 70 and the surface 80a of the second valve seat 80 that are opposite to the valve shaft 34. The first pressure applying portion 94 and the second pressure applying portion 96 are configured to apply the pressure of the fluid through the slight gap between the outer peripheral surface of the valve shaft 34 and the inner peripheral surface of the valve seat 8. Accordingly, as illustrated in FIG. 13(a), in the three-way motor valve 1, under a state in which an opening degree is 0%, that is, the first valve port 9 is nearly completely closed, and under a state in which the opening degree is 100%, that is, the first valve port 9 is nearly completely opened, when the first valve port 9 and the second valve port 18 are each brought closer to a completely closed state, an amount of outflow of the fluid through the first valve port 9 and the second valve port 18 is significantly reduced. Along with this, in the three-way motor valve 1, in the valve port brought closer to a completely closed state, the pressure of the fluid flowing out through the first valve port 9 or the second valve port 18 is reduced. Thus, for example, when the opening degree is 0%, that is, the first valve port 9 is completely closed, the fluid having a pressure of about 700 KPa flows in through the inflow port 26, and then flows out through the second valve port 18 while maintaining the pressure of about 700 KPa. At this time, on the side of the first valve port 9 that is nearly completely closed, a pressure on an outflow side is reduced to, for example, about 100 KPa. As a result, there is a difference in pressure of about 600 KPa between the second valve port 18 and the first valve port 9.

Therefore, in the three-way motor valve 1 against which no countermeasures are taken, due to the difference in pressure between the second valve port 18 and the first valve port 9, the valve shaft 34 is moved (displaced) to the side of the first valve port 9 under a relatively low pressure so that the valve shaft 34 is held in unbalanced contact with the bearing 41. As a result, there is a fear in that driving torque is increased when the valve shaft 34 is driven to rotate in a direction of closing the valve shaft 34, thereby causing operation malfunction.

Figure 17:
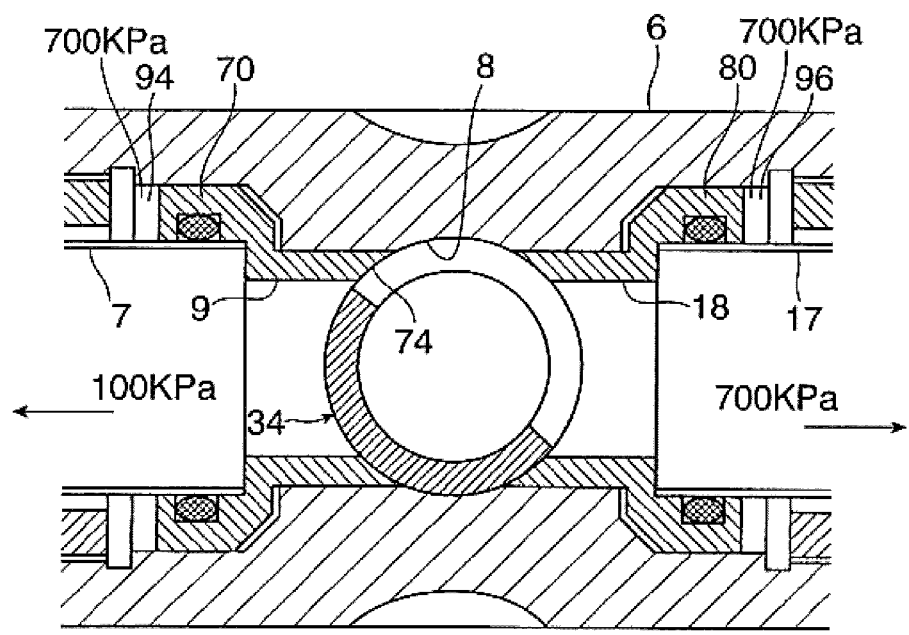
FIG. 17 is a sectional configuration view for illustrating a motion of the three-way motor valve as one example of the three-way valve for flow rate control according to the first embodiment of the present invention.

In contrast, in the three-way motor valve 1 according to the first embodiment of the present invention, as illustrated in FIG. 17, the first pressure applying portion 94 and the second pressure applying portion 96 are respectively provided to the surface of the first valve seat 70 and the surface of the second valve seat 80 that are opposite to the valve shaft 34. The first pressure applying portion 94 and the second pressure applying portion 96 are configured to apply, to the first valve seat 70 and the second valve seat 80, the pressure of the fluid leaking through the slight gap between the outer peripheral surface of the valve shaft 34 and the inner peripheral surface of the valve seat 8. Thus, in the three-way motor valve 1 according to the first embodiment of the present invention, even when there is a difference in pressure between the second valve port 18 and the first valve port 9, a relatively high pressure of the fluid is applied to the first pressure applying portion 94 and the second pressure applying portion 96 through the slight gap between the outer peripheral surface of the valve shaft 34 and the inner peripheral surface of the valve seat 8. As a result, owing to the relatively high pressure of the fluid of about 100 KPa, which is applied to the first pressure applying portion 94, the first valve seat 70 under a relatively low pressure of about 100 KPa is operated so as to restore the valve shaft 34 to a proper position. Therefore, the three-way motor valve 1 according to the first embodiment of the present invention can prevent and suppress the valve shaft 34 from being moved (displaced) to the side of the first valve port 9 under a relatively low pressure due to the difference in pressure between the second valve port 18 and the first valve port 9, can keep a state in which the valve shaft 34 is smoothly supported by the bearing 41, and can prevent and suppress an increase in driving torque when the valve shaft 34 is driven to rotate in the direction of closing the valve shaft 34.

Further, the three-way motor valve 1 according to the first embodiment of the present invention similarly operates also under a state in which the first valve port 9 is nearly completely opened, that is, the second valve port 18 is nearly completely closed, and thus can prevent and suppress the increase in driving torque when the valve shaft 34 is driven to rotate.

Second Embodiment

Figure 18:
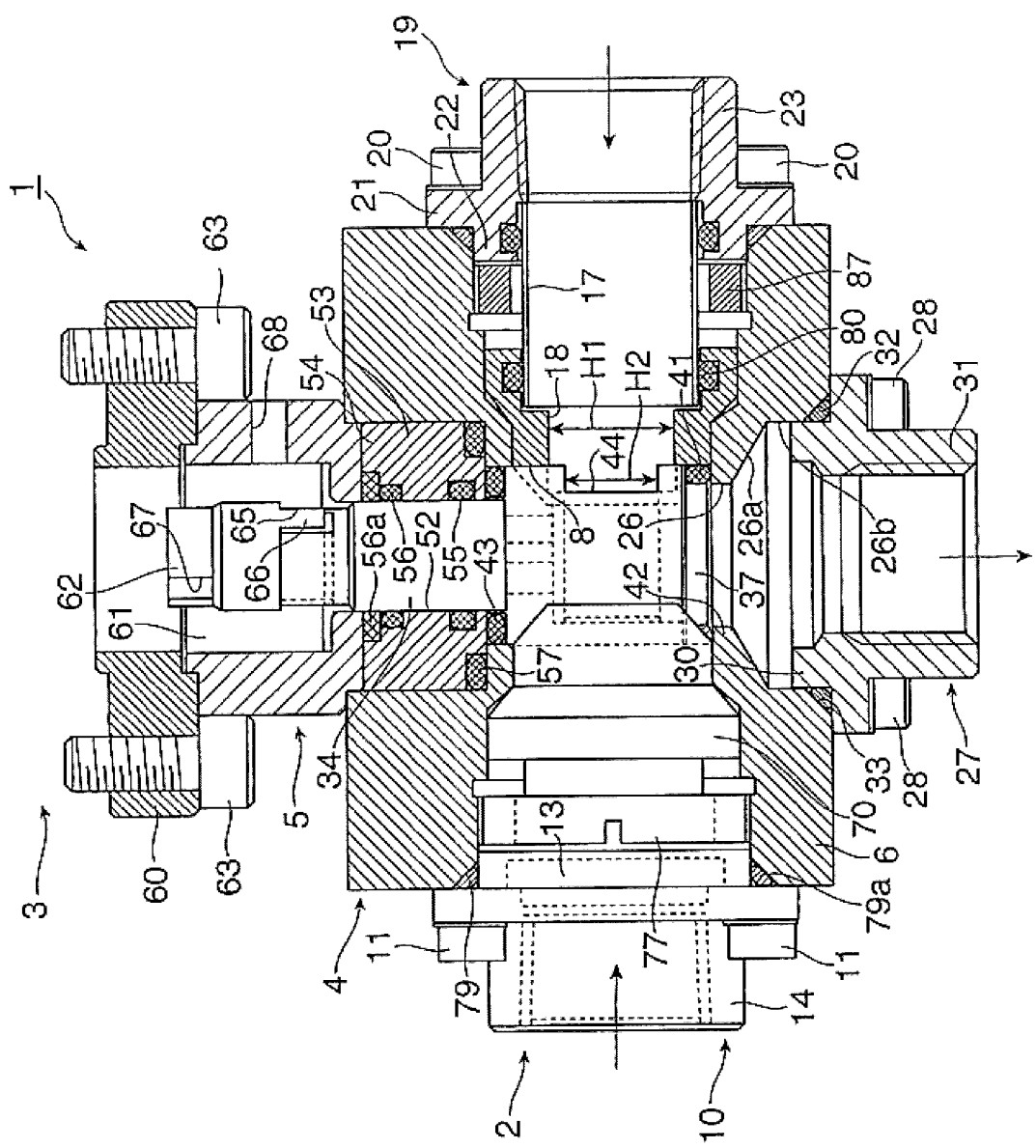
FIG. 18 is a sectional configuration view for illustrating a three-way motor valve as one example of a three-way valve for flow rate control according to a second embodiment of the present invention.

FIG. 18 is a view for illustrating a three-way motor valve as one example of a flow rate control valve according to a second embodiment of the present invention.

The three-way motor valve 1 according to the second embodiment is structured as the three-way motor valve 1 for mixing, which is configured to mix two kinds of different fluids instead of dividing the same fluid into two parts.

As illustrated in FIG. 18, the first inflow port 7 and the first valve port 9 are formed in one side surface of the valve main body 6 of the three-way motor valve 1. The first inflow port 7 allows inflow of a lower temperature fluid as a first fluid. The first valve port 9 has a rectangular cross section, and communicates with the valve seat 8 having a columnar space. In the second embodiment of the present invention, instead of directly forming the first outflow port 7 and the first valve port 9 in the valve main body 6, the first valve port 9 is formed in the first valve seat 70 as one example of a valve port forming member forming the first valve port 9, and the first inflow port 7 is formed in the first flow passage forming member 15 forming the first inflow port 7. The first valve seat 70 and the first flow passage forming member 15 are fitted to the valve main body 6, thereby providing the first inflow port 17 and the first valve port 9.

Further, the second inflow port 17 and the second valve port 18 are formed in another side surface of the valve main body 6 of the three-way motor valve 1. The second inflow port 17 allows inflow of a higher temperature fluid as a second fluid. The second valve port 18 has a rectangular cross section, and communicates with the valve seat 8 having a columnar space. In the second embodiment of the present invention, instead of directly forming the second inflow port 17 and the second valve port 18 in the valve main body 6, the second valve port 18 is formed in the second valve seat 80 as one example of a valve port forming member forming the second valve port 18, and the second inflow port 17 is formed in the second flow passage forming member 25 forming the second inflow port 17. The second valve seat 80 and the second flow passage forming member 25 are fitted to the valve main body 6, thereby providing the second inflow port 17 and the second valve port 18.

Further, the outflow port 26 is opened in a bottom surface of the valve main body 6 of the three-way motor valve 1. The outflow port 26 allows outflow of a fluid for temperature control, which is a mixture of fluids obtained by mixing the first and second fluids inside the valve main body 6.

Here, the lower temperature fluid as the first fluid and the higher temperature fluid as the second fluid are fluids to be used for temperature control. A fluid having a relatively lower temperature is referred to as "lower temperature fluid," and a fluid having a relatively higher temperature is referred to as "higher temperature fluid." Thus, the lower temperature fluid and the higher temperature fluid represents a relative relationship The lower temperature fluid is not a fluid having an absolutely low temperature, and the higher temperature fluid is not a fluid having an absolutely high temperature. As the lower temperature fluid and the higher temperature fluid, for example, under air pressure of from 0 MPa to 1 MPa and within a temperature range of from about 0° C. to about 80° C., water (such as pure water) adjusted to a temperature of from about 0° C. to about 30° C. and water (pure water) adjusted to a temperature of from about 50° C. to about 80° C. are suitably used, respectively. Further, as the lower temperature fluid and the higher temperature fluid, for example, within a temperature range of from about −20° C. to about +120° C., there is used a fluid such a fluorine-based inert liquid, for example, Fluorinert (trademark) and ethylene glycol, which are neither frozen at a temperature of about −20° C. nor boiled at a temperature of about +120° C.

The other configurations and operations are the same as those of the first embodiment described above, and hence description thereof is omitted.

Example 1

Figure 19:
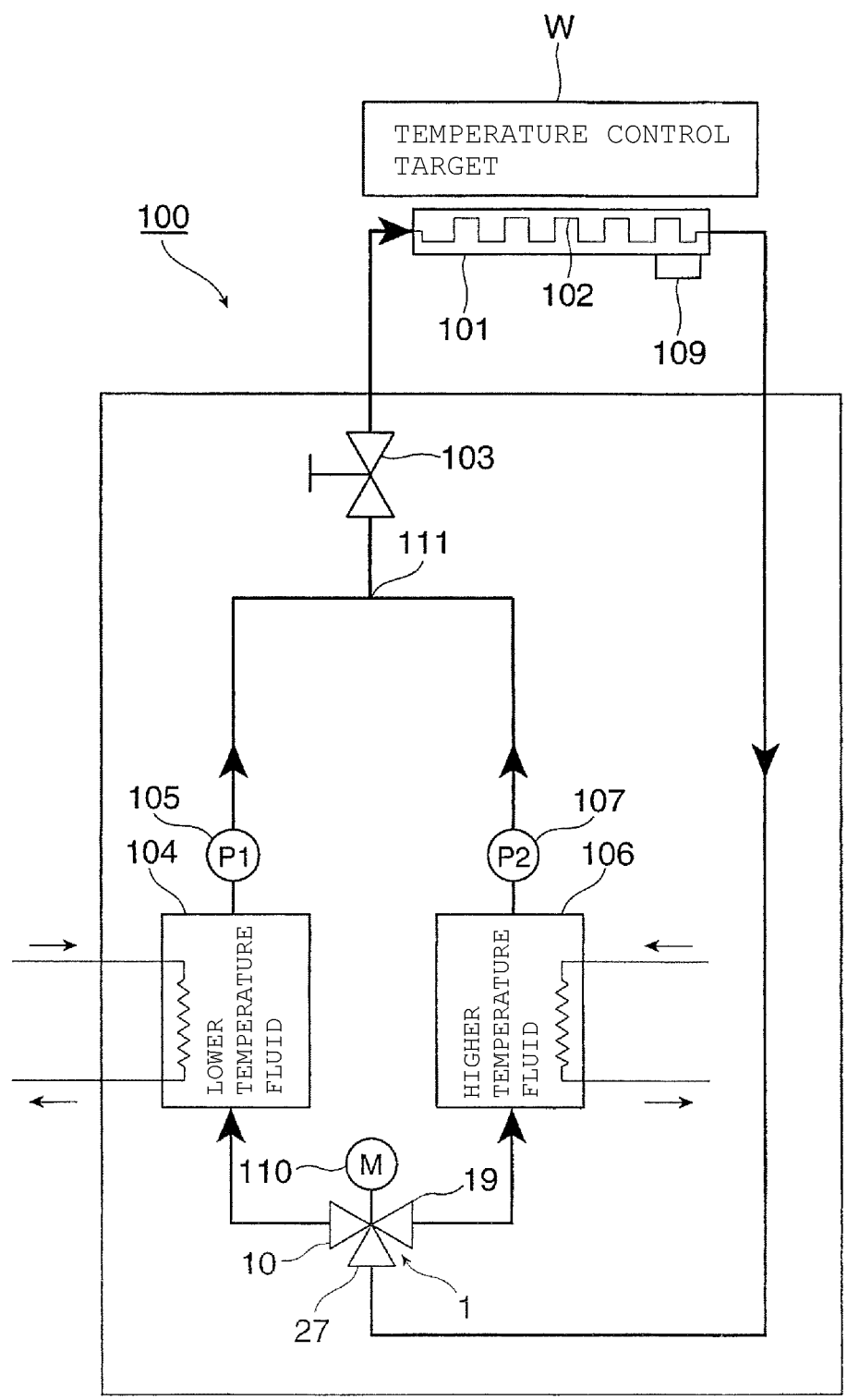
FIG. 19 is a schematic diagram for illustrating a constant-temperature maintaining device (chiller device) to which the three-way motor valve as one example of the three-way valve for flow rate control according to the first embodiment of the present invention is applied.

FIG. 19 is a schematic diagram for illustrating a constant-temperature maintaining device (chiller device) to which the three-way motor valve for flow rate control according to the first embodiment of the present invention is applied.

A chiller device 100 is, for example, used for a semiconductor manufacturing apparatus involving plasma etching, and configured to maintain a temperature of a semiconductor wafer or the like as one example of a temperature control target W to a constant temperature. The temperature control target W, for example, a semiconductor wafer, may rise in temperature along with generation or discharge of plasma or the like after being subjected to plasma etching or the like.

The chiller device 100 includes a temperature control portion 101 constructed to have a table-like shape as one example of the temperature control means arranged so as to be brought into contact with the temperature control target W. The temperature control portion 101 has a flow passage 102 for temperature control therein. The fluid for temperature control, which includes the lower temperature fluid and the higher temperature fluid having been adjusted in mixture ratio, flows through the flow passage 102 for temperature control.

Mixing means 111 is connected to the flow passage 102 for temperature control in the temperature control portion 101 through an open/close valve 103. A constant-temperature reservoir 104 for lower temperature is connected to one side of the mixing means 111. The constant-temperature reservoir 104 for lower temperature stores the low temperature fluid adjusted to a predetermined lower temperature. The lower temperature fluid is supplied to the three-way motor valve 1 from the constant-temperature reservoir 104 for lower temperature by a first pump 105. Further, a constant-temperature reservoir 106 for higher temperature is connected to another side of the mixing means 111. The constant-temperature reservoir 106 for higher temperature stores the high temperature fluid adjusted to a predetermined higher temperature. The higher temperature fluid is supplied to the three-way motor valve 1 from the constant-temperature reservoir 106 for higher temperature by a second pump 107. The mixing means 111 is connected to the flow passage 102 for temperature control in the temperature control portion 101 through the open/close valve 103.

Further, on an outflow side of the flow passage 102 for temperature control in the temperature control portion 101, a pipe for returning is provided. The pipe for returning is connected to the constant-temperature reservoir 104 for lower temperature and the constant-temperature reservoir 106 for higher temperature through the three-way valve 1 for flow rate control for division.

The chiller device 100 uses the three-way motor valve 1 in order to divide a fluid for control, which has flowed through the flow passage 102 for temperature control in the temperature control portion 101, between the constant-temperature reservoir 104 for lower temperature and the constant-temperature reservoir 106 for higher temperature. When the valve shaft 34 is driven to rotate by a stepping motor 110, the three-way motor valve 1 controls a flow rate of the fluid for control to be divided between the constant-temperature reservoir 104 for lower temperature and the constant-temperature reservoir 106 for higher temperature.

In a mixing portion 111 in which the lower temperature fluid supplied from the constant-temperature reservoir 104 for lower temperature by the first pump 105, and the higher temperature fluid supplied from the constant-temperature reservoir 106 for higher temperature by the second pump 107 are mixed together, there is used the mixing means for mixing the lower temperature fluid and the higher temperature fluid as appropriate after controlling the flow rate of the lower temperature fluid and the flow rate of the higher temperature fluid. As a matter of course, as described above, the three-way motor valve 1 for mixing may be used as the mixing means.

Example 2

Figure 20:
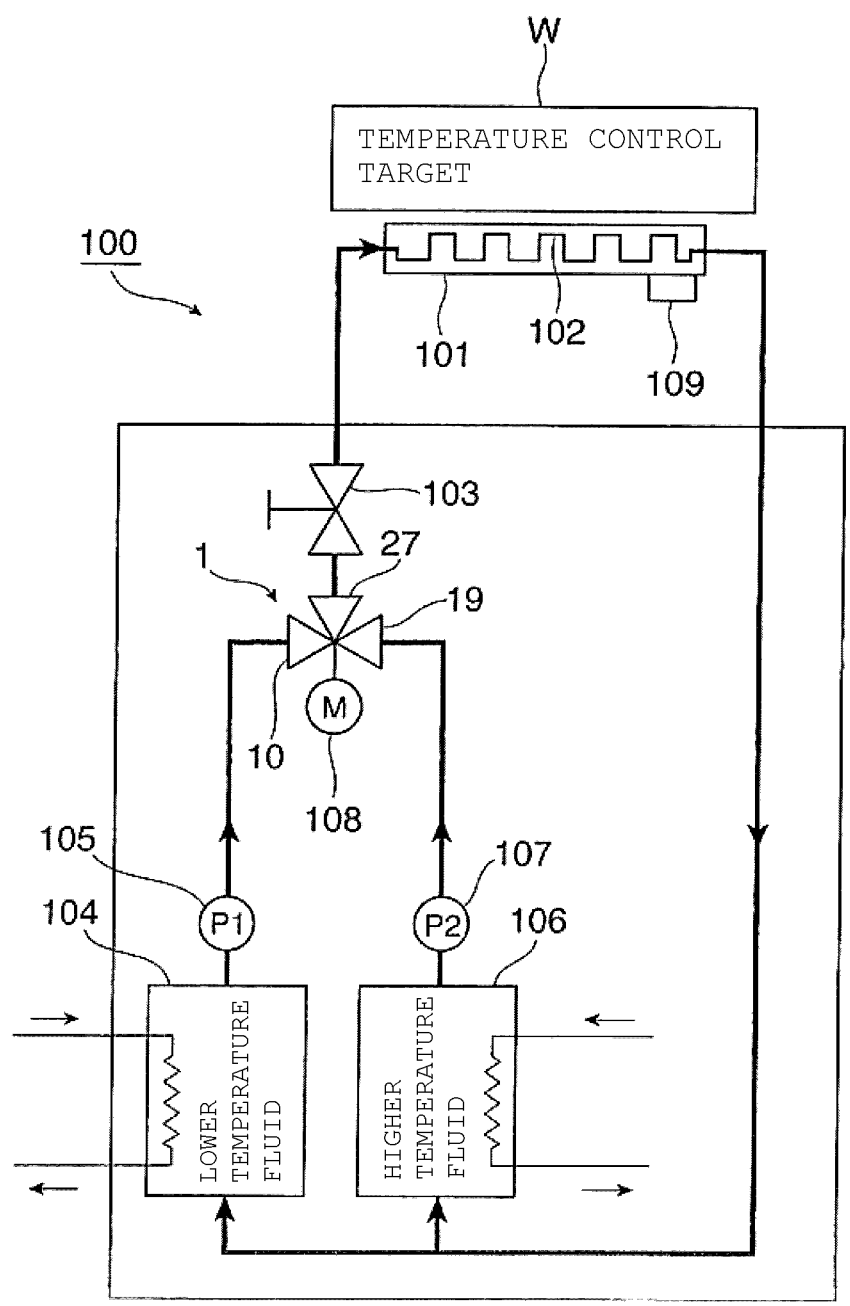
FIG. 20 is a schematic diagram for illustrating a constant-temperature maintaining device (chiller device) to which the three-way motor valve as one example of the three-way valve for flow rate control according to the second embodiment of the present invention is applied.

FIG. 20 is a schematic diagram for illustrating a constant-temperature maintaining device (chiller device) to which the three-way motor valve for flow rate control according to the second embodiment of the present invention is applied.

The three-way motor valve 1 is connected to the flow passage 102 for temperature control in the temperature control portion 101 through an open/close valve 103. A constant-temperature reservoir 104 for lower temperature is connected to the first flange portion 10 of the three-way motor valve 1. The constant-temperature reservoir 104 for lower temperature stores the low temperature fluid adjusted to a predetermined lower temperature. The lower temperature fluid is supplied to the three-way motor valve 1 from the constant-temperature reservoir 104 for lower temperature by a first pump 105. Further, a constant-temperature reservoir 106 for higher temperature is connected to the second flange portion 19 of the three-way motor valve 1. The constant-temperature reservoir 106 for higher temperature stores the high temperature fluid adjusted to a predetermined higher temperature. The higher temperature fluid is supplied to the three-way motor valve 1 from the constant-temperature reservoir 106 for higher temperature by a second pump 107. The third flange member 27 of the three-way motor valve 1 is connected to the flow passage 102 for temperature control in the temperature control portion 101 through the open/close valve 103.

Further, on an outflow side of the flow passage 102 for temperature control in the temperature control portion 101, a pipe for returning is provided. The pipe for returning is connected to the constant-temperature reservoir 104 for lower temperature and the constant-temperature reservoir 106 for higher temperature.

The three-way motor valve 1 includes a stepping motor 108 configured to drive the valve shaft 34 to rotate. Further, a temperature sensor 109 configured to detect a temperature of the temperature control portion 101 is provided to the temperature control portion 101. The temperature sensor 109 is connected to a control device (not shown), and the control device is configured to control a drive of the stepping motor 108 of the three-way motor valve 1.

As illustrated in FIG. 20, in the chiller device 100, a temperature of the temperature control target W is detected by the temperature sensor 109. Based on a detection result obtained by the temperature sensor 109, the rotation of the stepping motor 108 of the three-way motor valve 1 is controlled by the control device. Accordingly, the temperature control target W is controlled to a temperature equal to a predetermined temperature.

When the valve shaft 34 is driven to rotate by the stepping motor 108, the three-way motor valve 1 controls the mixture ratio between the lower temperature fluid, which is supplied from the constant-temperature reservoir 104 for lower temperature by the first pump 105, and the higher temperature fluid, which is supplied from the constant-temperature reservoir 106 for higher temperature by the second pump 107, to control a temperature of the fluid for temperature control, which is a mixture of the lower temperature fluid and the higher temperature fluid to be supplied to the flow passage 102 for temperature control in the temperature control portion 101 from the three-way motor valve 1 through the open/close valve 103.

At this moment, the three-way motor valve 1 is capable of controlling the mixture ratio between the lower temperature fluid and the higher temperature fluid in accordance with the rotation angle of the valve shaft 34 with high accuracy, thereby being capable of finely adjusting a temperature of the fluid for temperature control. Thus, the chiller device 100 using the three-way motor valve 1 according to the embodiment of the present invention is capable of controlling a temperature of the temperature control target W, which is brought into contact with the temperature control portion 101, to a desired temperature, by allowing the fluid for temperature control, which is controlled in mixture ratio between the lower temperature fluid and the higher temperature fluid and adjusted in temperature to a predetermined temperature, to flow through the flow passage 102 for temperature control in the temperature control portion 101.

INDUSTRIAL APPLICABILITY

The present invention can provide the flow rate control valve capable of suppressing the increase in driving torque for the valve body, which is caused due to contact between the valve body and the valve port forming member, and provide the temperature control device using the flow rate control valve.

REFERENCE SIGNS LIST

1 . . . three-way motor valve
2 . . . valve portion
3 . . . actuator
4 . . . sealing portion
5 . . . coupling portion
6 . . . valve main body
7 . . . first inflow port
8 . . . valve seat
9 . . . first valve port
10 . . . first flange member
11 . . . hexagon socket head cap screw
12 . . . flange portion
13 . . . insertion portion
14 . . . pipe connecting portion
15 . . . O-ring
16 . . . chamfer
17 . . . second inflow port
18 . . . second valve port
19 . . . second flange member
20 . . . hexagon socket head cap screw
21 . . . flange portion
22 . . . insertion portion
23 . . . pipe connecting portion
34 . . . valve shaft
35 . . . valve body portion
45 . . . valve operating portion
45a, 45b . . . both end portions
70, 80 . . . first and second valve seat
74, 84 . . . concave portion
94, 96 . . . first and second pressure applying portion

The invention claimed is:

1. A three-way valve for flow rate control, comprising:
a valve main body including a valve seat, the valve seat having a columnar space and having a first valve port, which allows outflow of a fluid and has a rectangular cross section, and a second valve port, which allows outflow of the fluid and has a rectangular cross section;
first and second valve port forming members, which are fitted to the valve main body and form the first valve port and the second valve port, respectively;
a valve body being provided in a freely rotatable manner in the valve seat of the valve main body so as to simultaneously switch the first valve port from a closed state to an opened state and switch the second valve port from an opened state to a closed state, the valve body having a cylindrical shape and having an opening;
a pressure applying portion configured to apply a pressure of the fluid leaking through a gap between the valve body and the valve seat to the first and second valve port forming members so as to suppress shift of a position of the valve body when the valve body opens and closes the first valve port and the second valve port; and
drive means for driving the valve body to rotate.

2. The three-way valve for flow rate control according to claim 1, wherein the pressure applying portion applies the pressure of the fluid leaking through the gap between the valve body and the valve seat to surfaces of the first and second valve port forming members opposite to the valve body, and supports the valve body by the first and second valve port forming members, thereby suppressing the shift of the position of the valve body caused due to a difference in pressure of the fluid flowing out or flowing in through the first valve port and the second valve port.

3. The three-way valve for flow rate control according to any one of claims 1 to 2, wherein the pressure applying portion is partitioned from the fluid flowing through the first valve port and the second valve port.

4. The three-way valve for flow rate control according to claim 1,
wherein the first and second valve port forming members are fitted so as to be freely movable in a direction of moving close to and away from the valve body, and
wherein the three-way valve for flow rate control comprises an adjusting member configured to adjust a position of each of the first and second valve port forming members by pushing and moving a surface of each of the first and second valve port forming members opposite to the valve body.

5. The three-way valve for flow rate control according to claim 1, wherein the valve main body includes a connecting member configured to connect a member allowing the fluid to flow through the valve main body, and first and second flow passage forming members configured to connect the connecting member and the first and second valve port forming members in a sealed state.

6. The three-way valve for flow rate control according to claim 4, wherein the adjusting member pushes and moves each of the first and second valve port forming members through intermediation of an elastic member that allows each of the first and second valve port forming members to move in a direction of moving close to and away from the valve body.

7. A temperature control device, comprising:

temperature control means having a flow passage for temperature control, which allows a fluid for temperature control to flow therethrough, the fluid for temperature control including a lower temperature fluid and a higher temperature fluid adjusted in mixture ratio;

first supply means for supplying the lower temperature fluid adjusted to a first predetermined lower temperature;

second supply means for supplying the higher temperature fluid adjusted to a second predetermined higher temperature;

mixing means, which is connected to the first supply means and the second supply means, for mixing the lower temperature fluid supplied from the first supply means and the higher temperature fluid supplied from the second supply means and supplying a mixture of the lower temperature fluid and the higher temperature fluid to the flow passage for temperature control; and a flow rate control valve configured to divide the fluid for temperature control having flowed through the flow passage for temperature control between the first supply means and the second supply means while controlling a flow rate of the fluid for temperature control, wherein the three-way valve for flow rate control claim 1 is used as the flow rate control valve.

8. A three-way valve for flow rate control, comprising:

a valve main body including a valve seat, the valve seat having a columnar space and having a first valve port, which allows inflow of a first fluid and has a rectangular cross section, and a second valve port, which allows inflow of a second fluid and has a rectangular cross section;

first and second valve port forming members, which are fitted to the valve main body and form the first valve port and the second valve port, respectively;

a valve body being provided in a freely rotatable manner in the valve seat of the valve main body so as to simultaneously switch the first valve port from a closed state to an opened state and switch the second valve port from an opened state to a closed state, the valve body having a cylindrical shape and having an opening;

a pressure applying portion configured to apply pressures of the first fluid and the second fluid leaking through a gap between the valve body and the valve seat to the first and second valve port forming members so as to suppress shift of a position of the valve body when the valve body opens and closes the first valve port and the second valve port; and drive means for driving the valve body to rotate.

9. A temperature control device, comprising:

temperature control means having a flow passage for temperature control, which allows a fluid for temperature control to flow therethrough, the fluid for temperature control including a lower temperature fluid and a higher temperature fluid adjusted in mixture ratio;

first supply means for supplying the lower temperature fluid adjusted to a first predetermined lower temperature;

second supply means for supplying the higher temperature fluid adjusted to a second predetermined higher temperature;

a flow rate control valve, which is connected to the first supply means and the second supply means, for flowing, to the flow passage for temperature control, the lower temperature fluid supplied from the first supply means and the higher temperature fluid supplied from the second supply means while adjusting the mixture ratio thereof wherein the three-way valve for flow rate control of claim 8 is used as the flow rate control valve.

\* \* \* \* \*